United States Patent [19]
O'Connor et al.

[11] Patent Number: 5,638,499
[45] Date of Patent: Jun. 10, 1997

[54] IMAGE COMPOSITION METHOD AND APPARATUS FOR DEVELOPING, STORING AND REPRODUCING IMAGE DATA USING ABSORPTION, REFLECTION AND TRANSMISSION PROPERTIES OF IMAGES TO BE COMBINED

[76] Inventors: Michael O'Connor, 11127 Palos Verdes Dr., Cupertino, Calif. 95014; Mario D. Nemirovsky, 5999 W. Walbrook Dr., San Jose, Calif. 95129

[21] Appl. No.: 250,070

[22] Filed: May 27, 1994

[51] Int. Cl.$^6$ ........................................ G06T 7/00
[52] U.S. Cl. .................. 395/131; 395/129; 395/135; 358/504
[58] Field of Search ........................... 395/135, 131, 395/132, 126, 121, 122; 348/34, 370; 354/100, 127.1; 358/316, 504, 506, 509, 510

[56] References Cited

U.S. PATENT DOCUMENTS

| | | | |
|---|---|---|---|
| 3,095,304 | 6/1963 | Vlahos | 353/28 |
| 3,158,477 | 11/1964 | Vlahos | 430/359 |
| 4,100,569 | 7/1978 | Vlahos | 348/587 |
| 4,409,611 | 10/1983 | Vlahos | 348/587 |
| 4,625,231 | 11/1986 | Vlahos | 348/587 |
| 5,271,097 | 12/1993 | Barker et al. | 395/153 |
| 5,357,579 | 10/1994 | Buchner et al. | 382/1 |
| 5,374,193 | 12/1994 | Adams, Jr. | 395/131 |
| 5,408,447 | 4/1995 | Cottrel et al. | 358/505 |
| 5,414,535 | 5/1995 | FKanmoto et al. | 358/487 |
| 5,430,282 | 7/1995 | Smith et al. | 235/455 |
| 5,557,339 | 9/1996 | Dadourian | 348/586 |

OTHER PUBLICATIONS

Porter, Thomas + Duff, Tom; "Compositing Digital Images", *Computer Graphics*, vol. 18, No. 3 (Jul. 1984).

Foley et al., *Computer Graphics: Principles and Practice*, Second Edition, 1993, pp. 754, 755.

Mammen, "Transparency and Antialiasing Algorithms Implemented with the Virtual Pixel Maps Technique", *IEEE Computer Graphics & Application*, pp. 43–55, Jul. 1989.

Klinker et al., "The Measurement of Highlights in Color Images", *International Journal of Computer Vision*. 2. pp. 7–32, 1988.

*Primary Examiner*—Heather R. Herndon
*Assistant Examiner*—Stephen Hong
*Attorney, Agent, or Firm*—Claude A. S. Hamrick

[57] ABSTRACT

A method and apparatus for implementing a new imaging and image composition system based on the real world metaphor of surface absorption, reflection, and transmission where many layers of translucent and opaque objects are composed into a final image for output to a video display. The algorithms are a substitution for both "Painter's algorithm" (the image composition technique traditionally used in computer graphic systems) and the alpha blending algorithms presently used in the computer and television industries for video special effects such as cross-fades between images, transparency, and color keying. In contrast to the prior art "colored pixel" algorithms, this system is based on a light propagation metaphor that uses virtual light source illumination and the absorption, reflection, and transmission properties of the objects in the image to create the final screen image. Thus, instead of representing each picture element (pixel) by color components specified by a chosen color model (e.g., RGB, YUV, Lab, HSV, YIQ, HLS, CMY, CMYK, etc.), the pixels in the subject system are represented by six explicit transformation components ($r_1, r_2, r_3, t_1, t_2, t_3$) and three implicit transformation components ($a_1, a_2, a_3$), wherein a, r and t refer to absorption, reflection and transmission, respectively, and the subscripts 1, 2 and 3 refer to the components of the chosen color model.

27 Claims, 19 Drawing Sheets

Photo 1
Black Background

Photo 2
White Background

Object 1:  r(1), t(1), a(1)          r(1), t(1), a(1)

Object 2:  r(2) = 0, t(2) = 0, a(2) = 1    r(3) = 1, t(3) = 0, a(3) = 0

IMAGE COMPOSITION METHOD AND APPARATUS FOR DEVELOPING, STORING AND REPRODUCING IMAGE DATA USING ABSORPTION, REFLECTION AND TRANSMISSION PROPERTIES OF IMAGES TO BE COMBINED

BACKGROUND OF THE INVENTION

1. Field of the Invention

The present invention relates generally to computerized imaging methods and apparatus, and more particularly to a novel imaging apparatus and method in which objects are composed of pixel data in which the transformation of virtual light interacting with them is specified by six explicit transformation components and three implicit transformation components.

2. Brief Description of the Prior Art

Painter's algorithm is the prevalent prior art in computer image composition. This algorithm uses a bottom-to-top "king of the mountain" approach to combine multiple overlayed opaque images. It first lays down the bottom most image (Object B), then writes over (replaces) the portions of that image that are overlayed by the image in the layer above it (Object A), and continues in this fashion until all layers have been composed (FIG. 1). Thus, what is seen on an imaging display are the colors from the topmost objects on the screen. Two pixels (picture elements) from Object A overlap the pixels directly below them in Object B. Since Object B's pixels are drawn to the composite image first, its two pixels that underlie Object A are overwritten as Object A is added to the final image.

One major drawback to Painter's algorithm is that every bit of color data for every object displayed on the screen must be read, transferred, and written to compose the final image. This means that even the portions of objects that are hidden by overlaying objects must be processed identically to those portions of objects that can be seen.

When Painter's algorithm is used with translucent images or graphic objects, an "alpha" blending algorithm is predominantly used to combine the layers. This alpha blending uses either a single number that defines the percentages of each of two layers (the composite layer and the next layer to be added) to use in creating their combination, or a separate alpha percentage for each pixel in the images to be combined.

This second case is shown in FIG. 2, where Object A Alpha defines the percentage of Object A that is combined or blended with the objects below it to yield the composite. In this case, the alpha values for the two pixels of Object A that overlay Object B are 0.40, or 40% of the Object A pixels color is combined with 60% (1–0.4) of the Object B pixels below. An object in the layer directly above Object A is blended next with this A●B composite based on the Alpha layer associated with that object. Each layer above is then blended in turn (thus bottom-up composition) to yield the final composite image.

Painter's algorithm with alpha blending is counter intuitive in the way it blends colors. This is because the metaphor it emulates is that of a painter mixing and applying paints to a canvas. Here, since the painter cannot apply the last layer first, he or she must anticipate the effects of later translucent layers in the selection of the colors first applied to the canvas.

This back-to-front composing gives results that run counter to our experiences in the real world. Our intuitive view of the world is brought to us with light that has propagated to surfaces around us where some is reflected back to us, some is transmitted through the translucent surfaces to those that lie behind, and some is absorbed.

SUMMARY OF THE INVENTION

Briefly, the present invention is directed to methods and apparatus for implementing a new imaging and image composition system referred to as the ART ◊ IM (Absorption, Reflection, Transmission Image Composition Model and algorithms). The ART ◊ IM system is based on the real world metaphor of surface absorption, reflection, and transmission where many layers of translucent and opaque objects are composed into a final image for output to a video display. The algorithms are a substitution for both "Painter's algorithm" (FIG. 1) (the image composition technique traditionally used in computer graphic systems), and the alpha blending algorithms (FIG. 2) used in the computer and television industries for video special effects such as cross fades between images, transparency, and color keying.

In contrast to the prior art "colored pixel" algorithms, this system is based on a light propagation metaphor that uses virtual light source illumination and the absorption, reflection, and transmission properties of the objects in the image to create the final screen image. Thus, instead of representing each picture element (pixel) by color components specified by a chosen color model (e.g., RGB, YUV, Lab, HSV, YIQ, HLS, CMY, CMYK, etc.), the pixels in the subject system are represented by 6 explicit transformation components ($r_1, r_2, r_3, t_1, t_2, t_3$) and 3 implicit transformation components ($a_1, a_2, a_3$), within a, r and t refer to absorption, reflection and transmission, and the subscripts 1, 2, and 3 refer to the components of the chosen color model.

In accordance with the ART ◊ IM system, and as depicted in FIG. 3, light propagates from a distant source to the topmost object layer (viewer side) in a scene where some light is absorbed, some reflected and some transmitted. The light that is transmitted continues on to the next object layer where the process is repeated. The ART ◊ IM system algorithms calculate the total light reflected back to the viewer from all object layers. It includes the contributions from all of the modes of internal reflection between the layers which eventually reemerge and combine with the light directly reflected back to the viewer. As well, the ART ◊ IM system algorithms calculate the total light transmitted through all of the layers of objects (including all of the modes of internally reflected light which reemerge below the last layer going away from the viewer) and all of the light absorbed by all of the layers.

These and other objects and advantages of the present invention will no doubt become apparent to those skilled in the art after having read the following detailed description of the preferred embodiment which is illustrated in the several figures of the drawing.

IN THE DRAWING

DETAILED DESCRIPTION OF THE PREFERRED EMBODIMENTS

Figure 1:
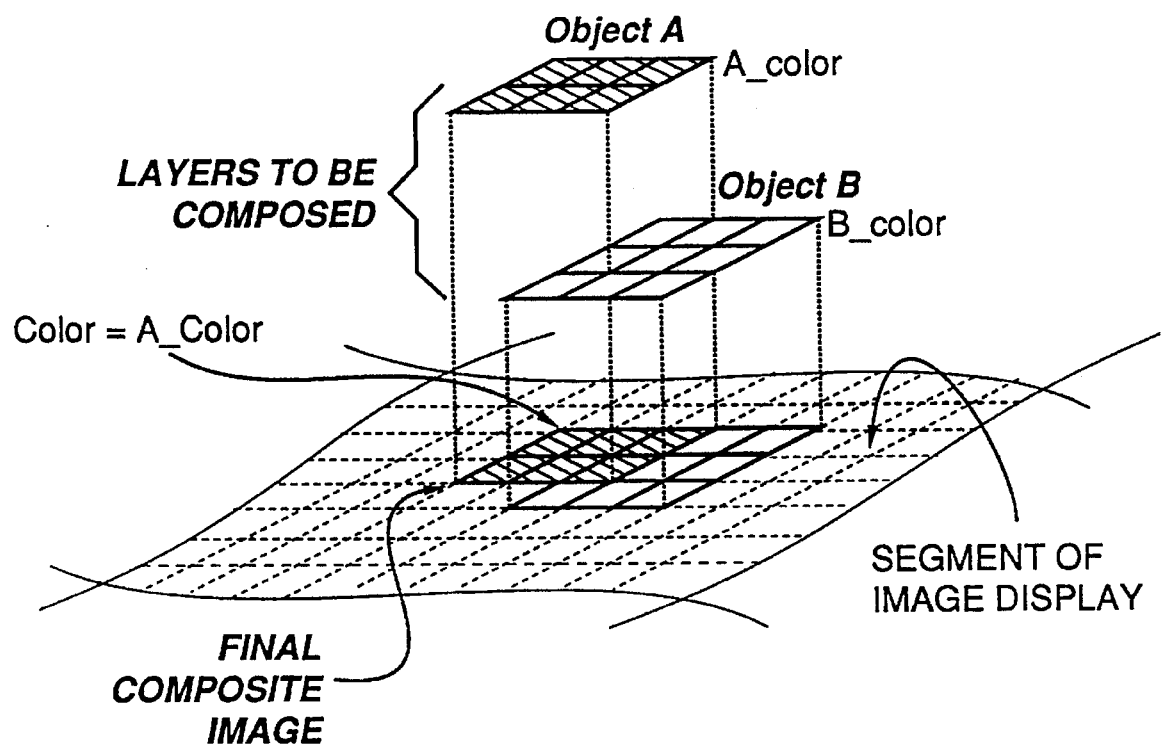
FIG. 1 is a diagram depicting the prior art Painter's Algorithm method of processing image pixel data.
Figure 2:
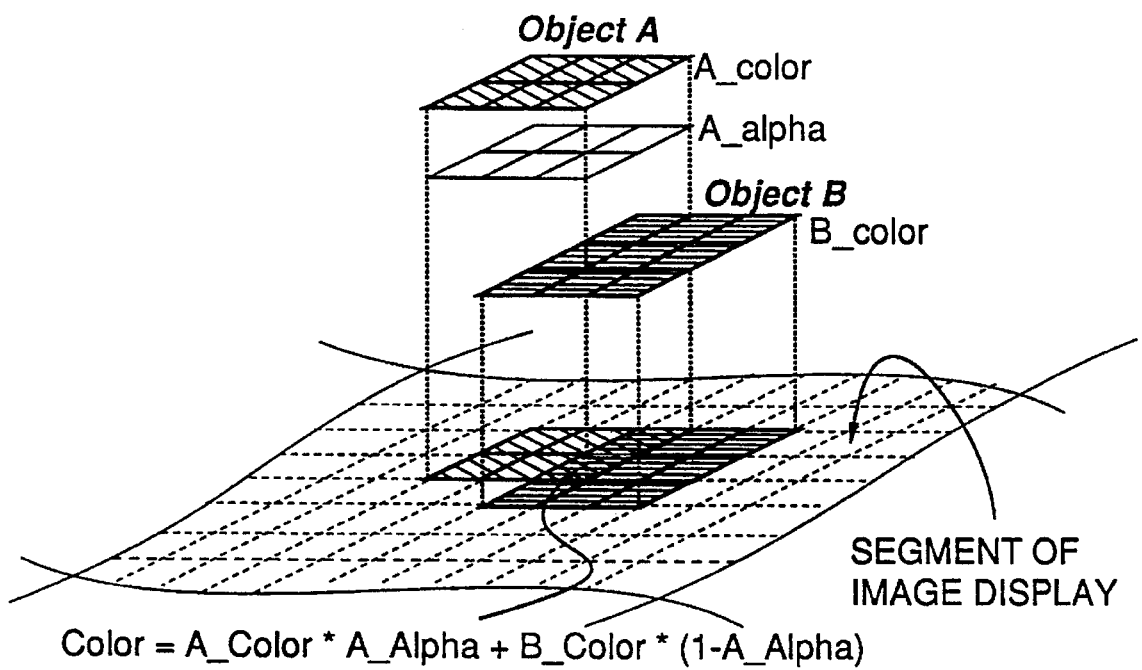
FIG. 2 is a diagram depicting the prior art method of processing image pixel data using bottom-up alpha blending.
Figure 3:
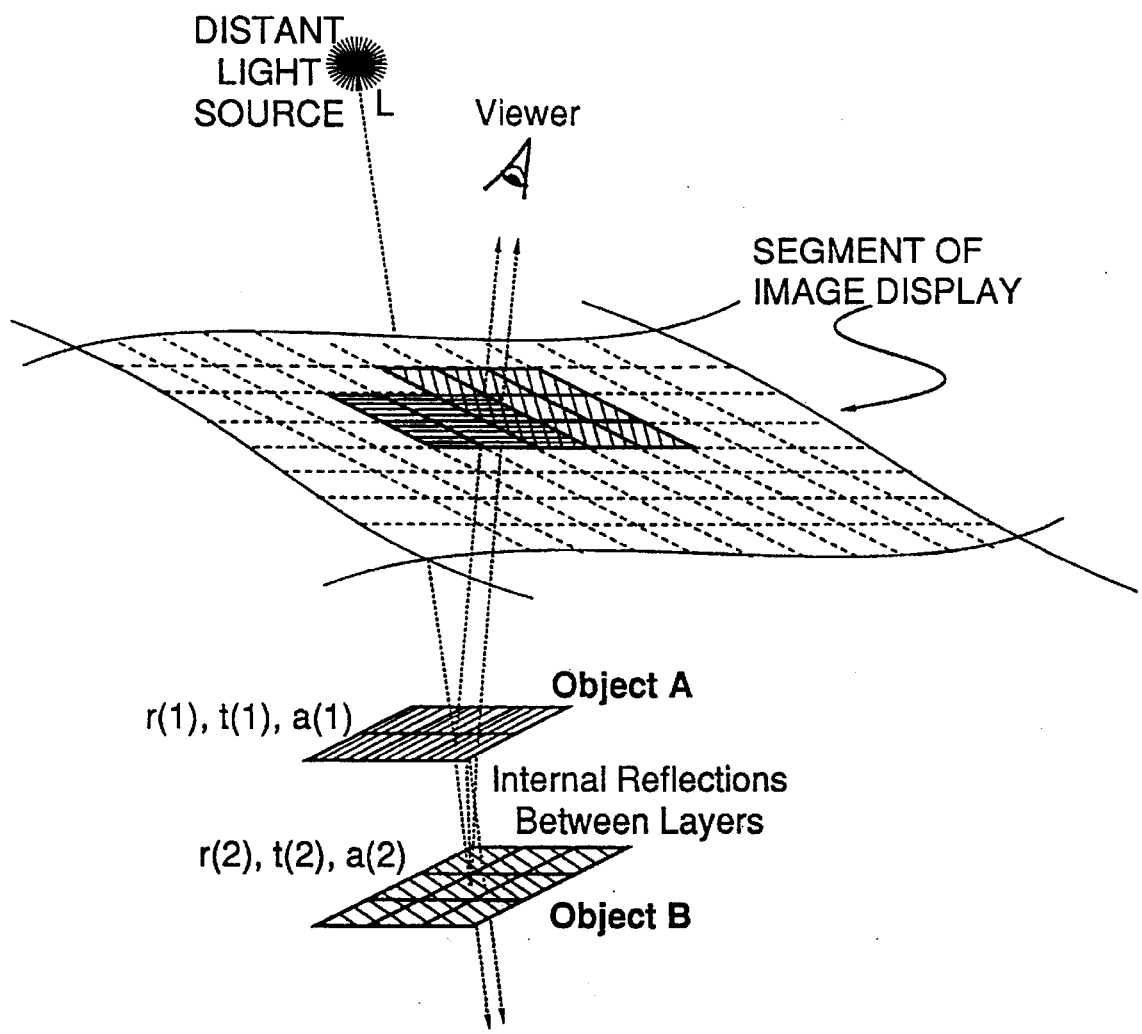
FIG. 3 is a diagram illustrating the basic concepts of the present invention.

The basic assumptions and properties of the elements that form the foundation of the ART◊IM are:

The Light Sources
- One or more light sources that can be positioned above, below or between the layers of objects in the scene to be composed.
- Light sources can be defined as any color allowed in the selected color space.
- Light propagates from each source to the layers of objects in the scene, is absorbed, reflected and transmitted through all of the layers of objects in the image.

The Graphic Objects
- Light is only reflected upward at an object's top surface and downward at the bottom surface (no internal reflection).
- Absorption, Reflection, and transmission properties of each object is uniform independent of the direction of light propagation.
- Objects are characterized by their absorption (a), reflection (r), and transmission (t) of light in three or more color space components (for example in RGB color space: $a_{red}$, $a_{green}$, $a_{blue}$, $r_{red}$, $r_{green}$, $r_{blue}$, $t_{red}$, $t_{green}$, $t_{blue}$) where $r+t+a=1$.
- All modes of internal reflection between any number of layers are included in the calculation of the total amount of light that is reflected back to a viewer, that is absorbed, and that is transmitted through all of the objects in an image.

In order to simplify the preferred embodiment, the following simplifications are made to the assumptions above.

Light Source
- A single virtual light source is assumed to be positioned at an infinite distance behind the viewer observing the scene on the image display.
- Illumination from the light source is uniform across all of the objects in the scene and propagates from the top most (viewer) side of the objects to the bottom side.

Graphic Object Properties
- Object surfaces are oriented orthogonal to the incident plane wave light from the light source.
- Reflection and transmission of the virtual light by objects is a plane wave and not a specular process.
- Absorption of light by objects is not evaluated directly (thus it is implicit) so that whatever percentage of light that is not reflected or transmitted by an object layer is lost from the process.

The Viewer
- The viewer of the composed image is positioned between the distant light source and the topmost object in the scene.
- The viewer sees only light that is reflected back from the top surfaces of the objects.
- Light that is transmitted through all of the objects in the scene is assumed is lost from the process and not seen by the viewer.

There are other simplifications, extensions, and restrictions to these general assumptions which can result in embodiments which hold true to the Art Imaging Model but take on a different form from the preferred embodiment described herein. These other embodiments may optimize the model for special applications like 3D imaging, where the components may be handled in a different manner. For example, the absorption "a" may be handled explicitly (as opposed to implicitly as defined below), or the r and t transformation components may be extended to include the angles of reflection and transmission.

NOTATION AND TERMINOLOGY

Figure 4:
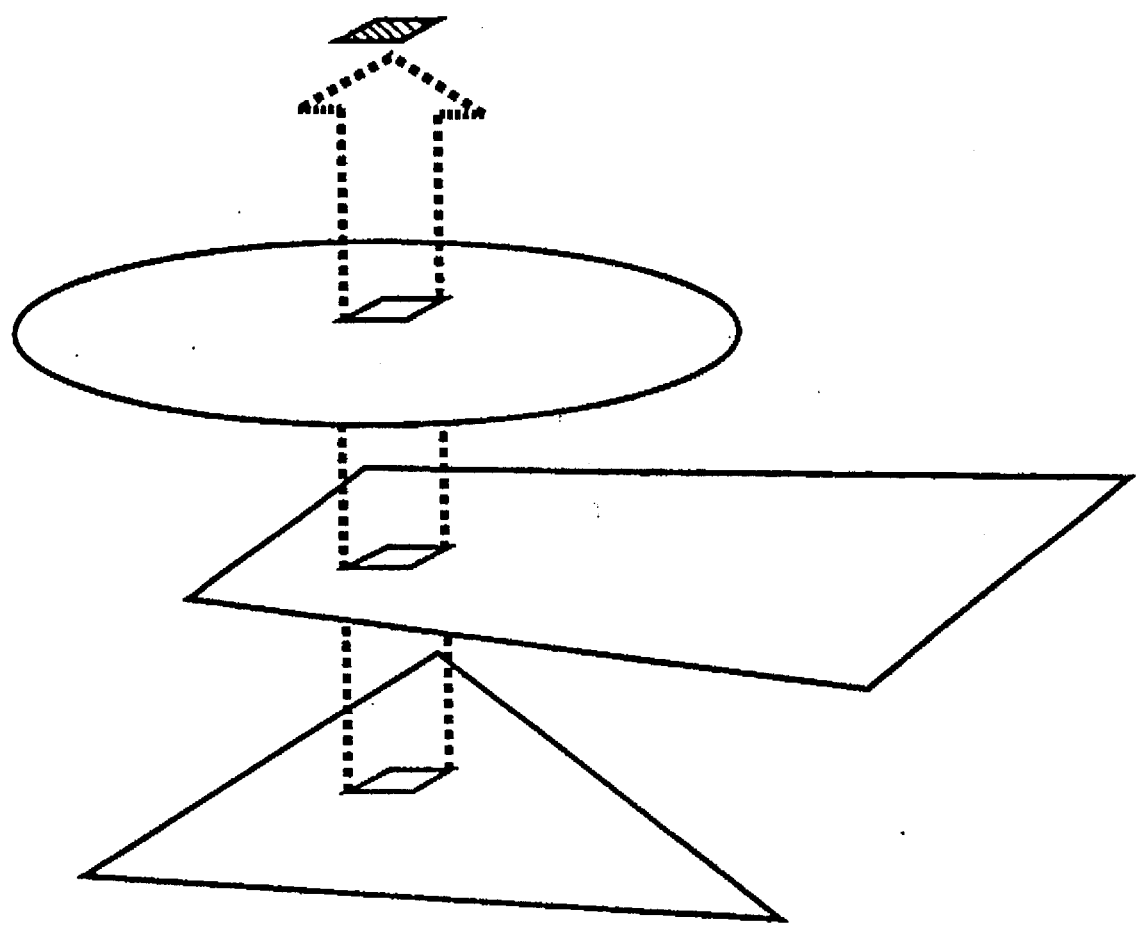
FIG. 4 illustrates a simplified example of pixel processing in accordance with the present invention.

In order to simplify the description of the ART Image Model, its image composition methods and algorithms are defined here as processes that sequentially operate on a single pixel from each object (or layer). These pixels and the final resulting pixel that is composed are all in vertical alignment. The ART◊IM algorithms start with the topmost object pixel $P_1$ and combine it with the next one $P_2$ immediately beneath it. The algorithms then proceed to combine it with the pixel $P_3$ in the next layer below that, and so on, until all of the required pixels have been combined into a final display pixel $P_z$ (FIG. 4). This is in contrast to current accepted methods for image composition, which are done from the bottom up and which require that all pixels in the image be included. Though the ART methods and algorithms are presented as a single pixel process, in a practical implementation a full image could be computed from the top down by combining all of pixels in a given layer before the contribution of the next lower layer is computed.

Throughout this document we will use the following notation when referring to the terms, parameters and ART coefficients used. For simplicity, a three-component RBG color model has been assumed. However, it is to be understood that the present invention also applies to the use of other color models, some of which are mentioned above, in which case the following would be adjusted to accommodate the particular color model chosen. The primary format that will be employed is:

$A'_{bc}(d)$

The main term "A" is a transformation component which could have the following values:
 r: reflection of a single layer
 t: transmission of a single layer
 R: reflection of a composite of multiple layers
 T: transmission of a composite of multiple layers
 L: incident plane wave light from a light source ($L_τ$—from above and $L_β$—from below)
 C: final image color that the viewer sees The prime (') refers to a resulting value after an iterative computation.

The subscript "b" indicates the surface (top or bottom) at which reflections occur. Possible values are:
 τ: reflecting from the top surface
 β: reflecting from the bottom surface The subscript "c", which may or may not be used, indicates the color component associated with the main term. If the RGB color model is used the possible values are:
 R: red component
 G: green component
 B: blue component The term (d) is an index that identifies the layer that the expression refers to. This index takes the values:
 i: the current layer being processed that lies immediately beneath layer i−1 i-1: the layer previously processed

One Layer Model

Figure 5A:
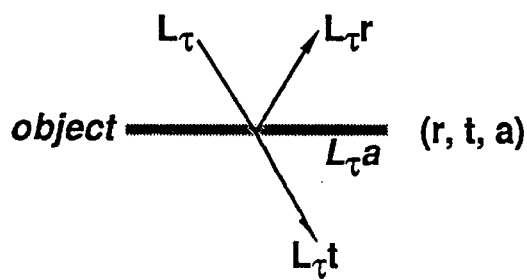
FIGS. 5a–13 are ray-tracing diagrams used to illustrate the present invention.
Figure 5B:
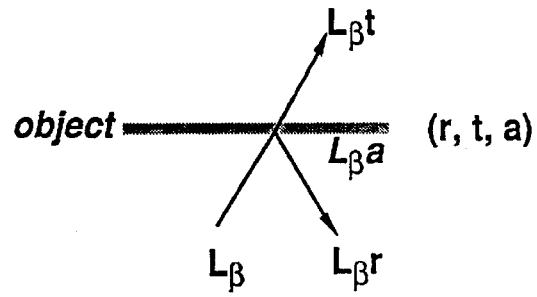

An object (FIG. 5a) receives the incident orthogonal plane wave light $L_\tau$ from the light source above. (All light rays are shown at an angle for clarity.) The object transforms the incident light by reflecting some percentage ($L_\tau r$) and transmitting some percentage ($L_\tau t$). The absorption of the incident light ($L_\tau a$) is handled implicitly (not directly calculated) since: r+t+a=1. Thus, the light transformation properties of a graphic object are completely described by a three component reflection vector r and a three component transmittance vector t. Since the ART ◊ IM properties of objects in the preferred embodiment are uniform independent of whether the light is coming from below or above, the reflection and transmission for a single object is equivalent for light propagating in both directions. The interaction of the object with light $L_\beta$ from below (FIG. 5b) mirrors the case of light from above with only changes in subscripts to indicate the light source and direction of propagation.

Two Layer Model

Figure 6:
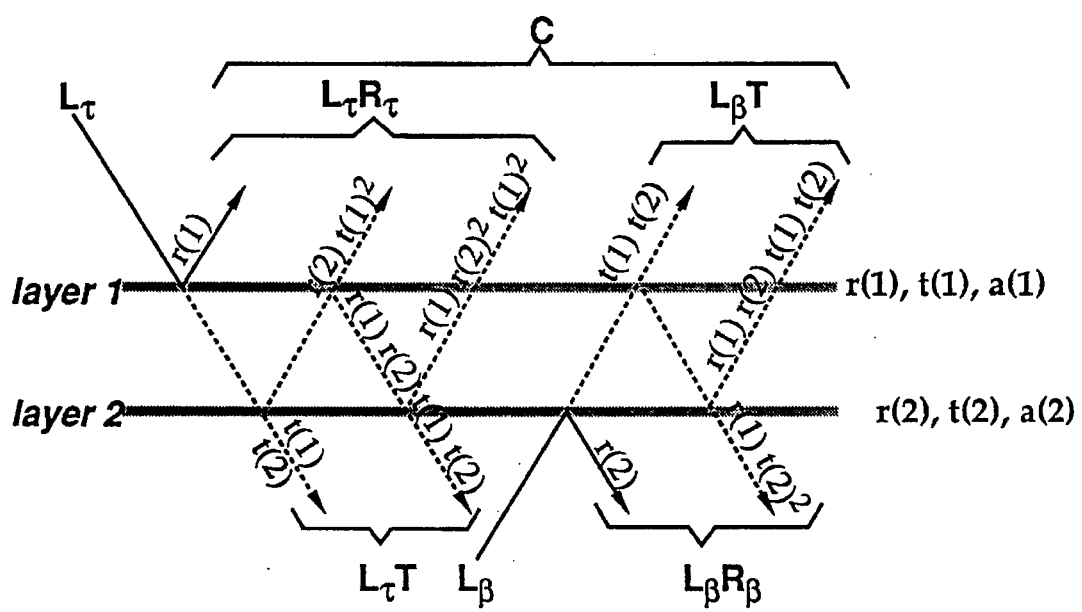

A two layer image in the preferred embodiment (FIG. 6) is composed of object(s) in layer 1 on top and layer 2 on the bottom and receives top incident light $L_\tau$ from a light source above and bottom incident light $L_\beta$ from a light source below. Some of $L_\tau$ is reflected from the top of layer 1 and some transmitted through to layer 2, where again some is reflected and some transmitted. Some of $L_\tau$ that is transmitted through layer 1 is reflected back and forth between the two layers to finally transmit back through either layer 1 to contribute to the total reflection ($R_\tau$), or through layer 2 to contribute to the total transmission (T).

Thus, $L_\tau R_\tau$ represents the sum of the light from the light source that is reflected from the top of layer 1, and the light that is internally reflected (0 & 3 & 5 & 7 & ... times) between the layers before being transmitted back upward through layer 1. $L_\beta R_\beta$ represents the converse of this for light that comes from a light source situated below the layers, where $R_\beta$ is the total reflection for light that comes from below. $L_\tau T$ and $L_\beta T$ represent the sum of the light directly transmitted through both of the layers, and the light that is internally reflected between the layers before finally being transmitted through the second layer in its initial direction. C represents the total light that a viewer sees in the interaction of the incident light with the two layers. Equation 0 expresses C for the case of two light sources (one on each side of the layers), and Equation 0a express C for the case of a single light source from above. Equation 0b expresses C for the case of a single light source from below:

$C=L_\tau R_\tau + L_\beta T$  EQN 0

$C=L_\tau R_\tau$  EQN 0a $C=L_\beta T$  EQN 0b

The Two Layer Model can be described mathematically by the following equations. The total reflection of light from the top for each color component can be expressed as:

$R_\tau = r(1) + r(2)t(1)^2 + r(1)r(2)^2t(1)^2 + r(1)^2r(2)^3t(1)^2 + \ldots$  EQN 1

This series converges to:

EQN 1a: $R_\tau = r(1) + \left\{ \dfrac{r(2)t(1)^2}{1-r(1)r(2)} \right\}$

As well, the total reflection of light from the bottom for each color component can be expressed as:

$R_\beta = r(2) + r(1)t(2)^2 + r(1)^2r(2)t(2)^2 + r(1)^3r(2)^2t(2)^2 + \ldots$  EQN 2

This series converges to:

EQN 2a: $R_\beta = r(2) + \left\{ \dfrac{r(1)t(2)^2}{1-r(1)r(2)} \right\}$

The transmission which is independent of light direction can be expressed for each color component as:

$T = t(1)t(2) + t(1)t(2)r(1)r(2) + t(1)t(2)r(1)^2r(2)^2 + \ldots$  EQN 3

This series converges to:

EQN 3a:  $T = \dfrac{t(1)t(2)}{1-r(1)r(2)}$

Whereas, the reflection of a single layer is always equal (uniform) independent of the direction of propagation of the light (upward or downward), this is not true for the combined reflections ($R_\tau$ & $R_\beta$) for the two layers. This is because the absorption of each layer can be different, and the computation of $R_\tau$ does not include the transmission term t(2) and absorption term a(2) of layer 2, while the computation of $R_\beta$ does not include the transmission term t(1) and the absorption term a(1) of layer 1. Thus, the computation of each light path that contributes to the R values involves both an even number of transmission terms (0 or 2), and an odd number of reflection terms (1,3,5, ... ). This results in an asymmetric reflection of the light propagating in either direction.

While $R_\tau$ and $R_\beta$ are not uniform, the transmission terms in both directions ($T_\tau$ & $T_\beta$) are always uniform, thus $T_\tau = T_\beta = T$. This is because T is composed all four transformation terms (r(1), t(1), r(2), t(2)) and involves both an even number of transmission terms (2) and reflection terms (0,2,4, ... ). This results in a symmetric transmission of the light propagating in either direction.

Figure 7:
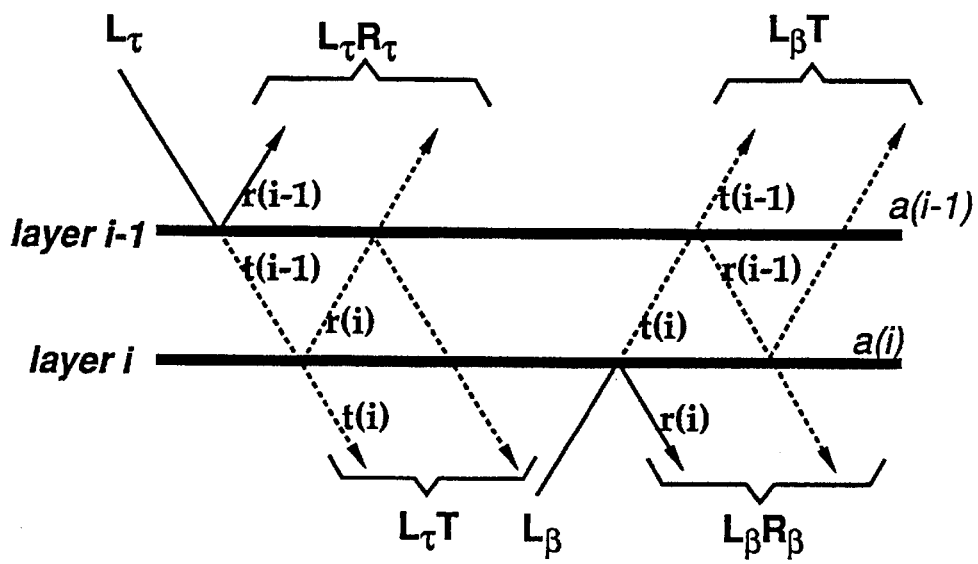

FIG. 7 illustrates a generalization of the two layer model described above. Here, two arbitrary layers, layer i-1 (top layer) and layer i (bottom layer), receive incident light from top and the bottom.

Figure 8:
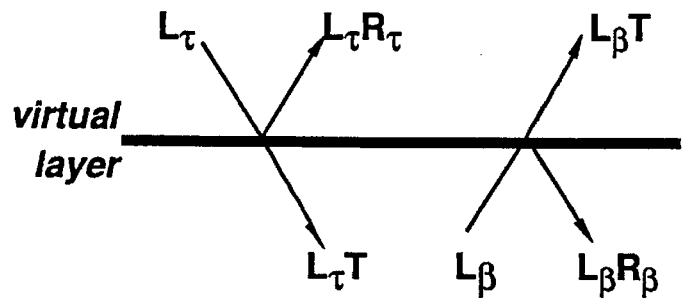

In the ART ◊ IM, the calculation of $R_\tau$, $R_\beta$, and T for two layers completely describes those layers as if they were a single layer. Thus, the combination of two layers into a composite image can be represented as a single "virtual" layer, or virtual object (FIG. 8). This also applies if one of the layers is already a virtual layer composed of many other layers.

Multi-Layer Model

Figure 9:
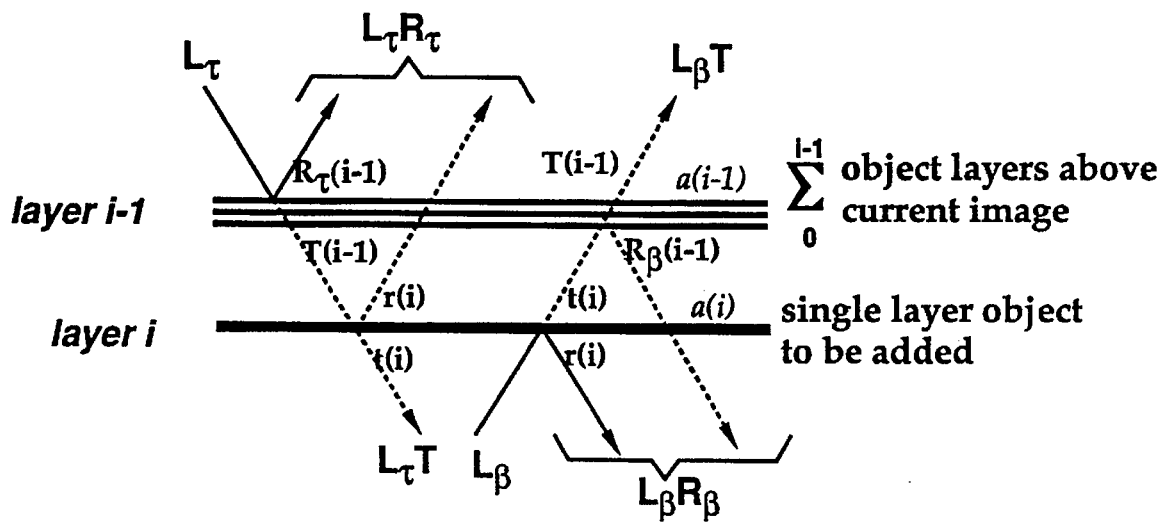

A multi-layer image (FIG. 9) is formed by the combination of a virtual layer i-1 (itself composed of multiple layers) and a new layer i. The reflection and transmission properties ($R_\tau(i-1)$, $R_\beta(i-1)$ & $T(i-1)$) of the virtual layer have been previously calculated. The total reflection and transmission ($R'_\tau$, $R'_\beta$ & $T'$) are calculated here as if the virtual layer and the new layer were the two layers in the two layer model above.

There are many forms that the evaluation of the final composed image (expressed by the term $L_\tau R_\tau$ for the case of a light source from above), as well as other terms, can take, including approximations which can be computed relatively easily and exact solutions involving more complicated computation. The embodiment of this evaluation that is described here by the Real Object Composition Equations (4a, 5a, 6a) is an exact solution requiring a minimum number of computations as each layer's contribution is computed consistent with the Multi Layer Model described above. Equations 4, 5 and 6 express the sum of the reflected and transmitted light over all modes of internal reflection and transmission between all of the layers in an image. The sum of the contribution of layer i to the reflection coefficient for light reflected back to the observer ($R_\tau$) across all modes of internal reflection (where n=# of internal reflections) is then:

$$R'_\tau(i) = R_\tau(i-1) + r(i)T(i-1)^2 \Sigma[R_\beta(i-1)r(i)]^n \quad \text{EQN4}$$

for: n=0 to infinity, $0 \geq \{r,t\} \leq 1$

Figure 10:
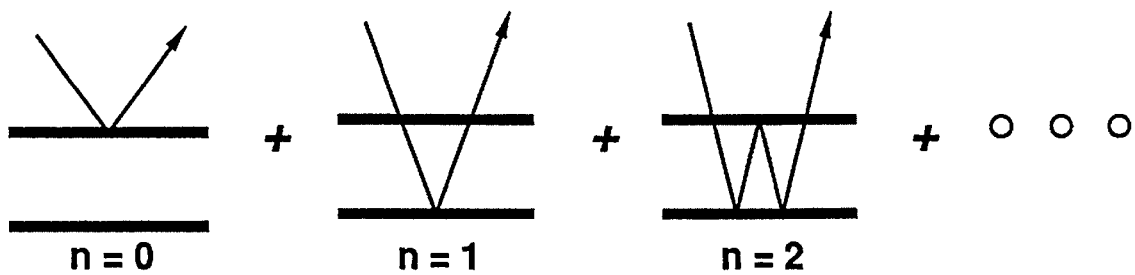

These modes of internal reflection are represented graphically for two layers in FIG. 10.

Since, in the limit the summation in Equation 4 converges to $1/R_\beta r_\tau(i)$, the exact solution for the sum of the light reflected back to the observer ($R'_\tau$) across all modes of internal reflection is:

$$\text{EQN4a: } R_\tau'(i) = R_\tau(i-1) + \left\{ \frac{r(i)T(i-1)^2}{1 - R_\beta(i-1)r(i)} \right\}$$

Similarly, the expressions for the sum of the contribution of layer i to the reflection coefficient for light reflected away from the observer ($R'_\beta$) across all modes of internal reflection are:

$$R'_\beta(i) = r(i) + R_\beta(i-1)t(i)^2 \Sigma[R_\beta(i-1)r(i)]^n \quad \text{EQN5}$$

for: n=0 to infinity, $0 \geq \{r,t\} \leq 1$

In the limit, the exact solution to equation 2 is:

$$\text{EQN5a: } R_\beta'(i) = r(i) + \left\{ \frac{R_\beta(i-1)t(i)^2}{1 - R_\beta(i-1)r(i)} \right\}$$

Finally, the expressions for the sum of the contribution of layer i to the transmission coefficient for light transmitted through in either direction (T') across all modes of internal reflection are:

$$T'(i) = T(i-1)t(i)\Sigma[R_\beta(i-1)r(i)]^n \quad \text{EQN6}$$

for: n=0 to infinity, $0 \geq \{r,t\} \leq 1$

In the limit, the exact solution to equation 6 is:

$$\text{EQN6a: } T'(i) = \frac{T(i-1)t(i)}{1 - R_\beta(i-1)r(i)}$$

Figure 11:
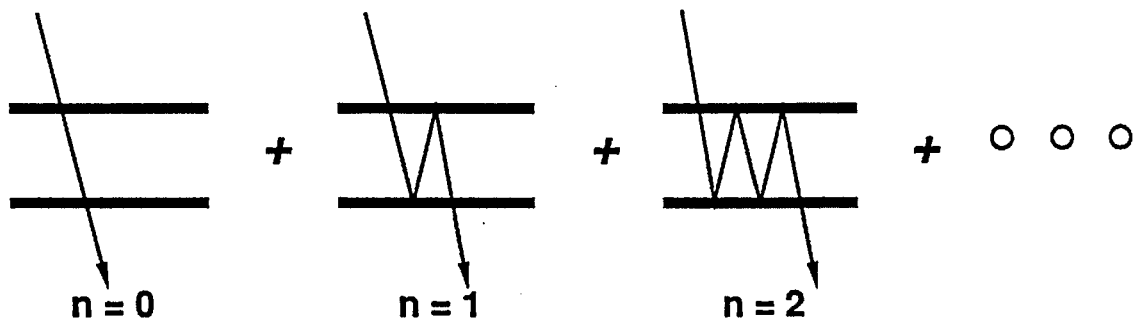

The modes of internal reflection for transmitted light are represented graphically in FIG. 11.

The implementation of the algorithms for the ART ◊ IM consist of iteratively evaluating equations 4a, 5a and 6a on the object layers from the top down as the contribution of each layer is accumulated in the terms $R'_\tau$, $R'_\beta$ and T'. Thus, when the final layer has been evaluated, or the composition process completed per some other criteria, the final image color ($C_{\tau RGB}$) that the viewer sees for a single light source from above is:

$$C_{\tau RGB} = L'_\tau R' \quad \text{EQN7}$$

or, for two light sources (one from above and one from below) the viewer will see:

$$C_{\tau RGB} = L'_\tau R'_\tau + L'_\beta T' \quad \text{EQN7a}$$

Though only two layers are illustrated with their associated modes of internal reflection and transmission, applying these equations iteratively with the virtual layer algorithm over any number of object layers does not effect the correctness of the computation. Thus, these equations provide exact solutions for $R'_\tau$, $R'_\beta$ and T' that account for contributions from all possible modes of internal reflection over any number of object layers.

Figure 12:
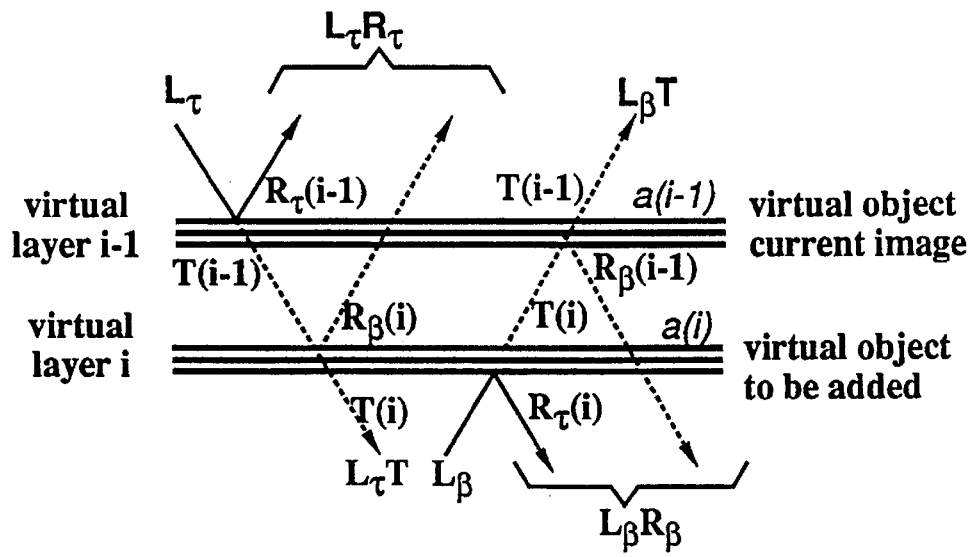

A virtual layer (virtual object) can be combined with another virtual layer (FIG. 12) in the same manner as described above in the Multi-Layer Model. In this case, instead of combining a single layer object (real object) (with transformation components $r_\tau$ & t) to the accumulated virtual layer above, a virtual object (itself composed of real objects) with transformation components $R_\tau$, $R_\beta$ & T is added.

Substituting the transformation components of the new virtual object to be added, for the real object transformation components in the Real Object Composition Equations (4a, 5a, and 6a), we have the Virtual Object Composition Equations:

$$\text{EQN 4a: } R_\tau'(i) = R_\tau(i-1) + \left\{ \frac{R_\tau(i)T(i-1)^2}{1 - R_\beta(i-1)R_\tau(i)} \right\}$$

$$\text{EQN 5b: } R_\beta'(i) = R_\beta(i) + \left\{ \frac{R_\beta(i-1)T(i)^2}{1 - R_\beta(i-1)R_\tau(i)} \right\}$$

$$\text{EQN 6b: } T'(i) = \frac{T(i-1)T(i)}{1 - R_\beta(i-1)R_\tau(i)}$$

Thus, complex images can be composed by iteratively adding or blending a combination of real (single layer) and virtual (multi-layer) ART graphic objects. The pixel information for real objects is stored in and manipulated in the ART Real Image Data Format consisting of the simple transformation components: $r_{\tau R}$, $r_{\tau G}$, $r_{\tau B}$, $t_R$, $t_G$, $t_B$. The pixel information for complex multi-layer virtual objects is stored in and manipulated in the ART Virtual Layer Image Data Format consisting of the complex transformation components: $R_{\tau R}$, $R_{\tau G}$, $R_{\tau B}$, $R_{\beta R}$, $R_{\beta G}$, $R_{\beta B}$, $T_R$, $T_G$, $T_B$.

Figure 13:
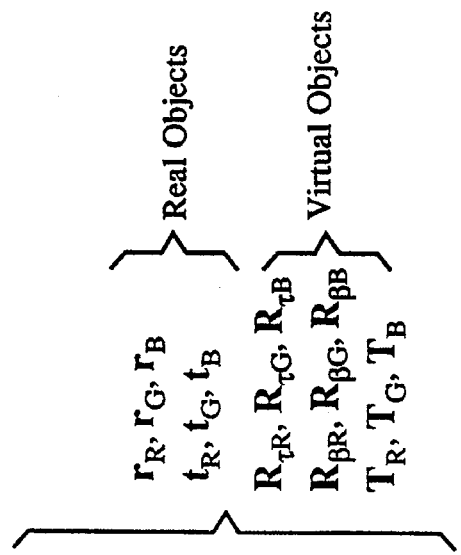

The ART models presented here can be simplified to reduce the number of computations for imaging systems (e.g. video games, multimedia systems) that cannot afford the cost of computing the exact solutions of the Multi-Layer Model. The first simplification that can be made to the ART Imaging Model is to allow reflection, but no transmission (FIG. 13—Opaque ART implementation). Here, only the reflection transformation components ($r_R$, $r_G$, $r_B$) are used to describe how light interacts with objects.

Since there is no transparency, the complex coupled equations of the exact ART solution for image composition can be eliminated entirely, and image composition with the ART formatted data can be implemented with Painters algorithm. This appears to be no different than just applying the color model that has been selected (RGB in our examples). However, since the light source color is extracted from an object's RGB color data (yielding the object's light transformation properties), the resulting ART image data is truly light source independent.

So, in the Opaque ART implementation object images are captured and the light source dependency is extracted from the color components to yield transformation components. These transformation components can be used for composition by existing systems in the same manner that they handle pixel color components via Painters Algorithm. Finally, when a scene is displayed, the ART transformation components are converted back to color components by integrating back the light source information.

In the Two Term ART implementation, we make the assumption that objects can transmit light, but reflection can only occur from the top surfaces of real and virtual objects (FIG. 13—Two Term Implementation). In this implementation, the total number of computations to compose a scene are reduced while yielding an image quality acceptable for many applications. This assumption is equivalent to using only the first two terms of the series in Equations 4, 5 and 6 as approximations to the exact solutions of the Real Object Composition Equations (4a, 5a, and 6a)

for composing real object images and the Virtual Object Composition Equations (4b, 5b and 6b) for composing virtual object images. Thus, in the Two Term Real Object Composition Equations are:

$$R'_\tau(i)=R_\tau(i-1)+r(i)T(i-1)^2 \qquad \text{EQN 4c}$$

$$R'_\beta(i)=r(i)+R_\beta(i-1)t(i)^2 \qquad \text{EQN 5c}$$

$$T'(i)=T(i-1)t(i)+R_\beta(i-1)r(i)T(i-1)t(i) \qquad \text{EQN 6c}$$

And, the Two Term Virtual Object Composition Equations are:

$$R'_\tau(i)=R_\tau(i-1)+R_\tau(i)T(i-1)^2 \qquad \text{EQN 4d}$$

$$R'_\beta(i)=R_\beta(i)+R_\beta(i-1)T(i)^2 \qquad \text{EQN 5d}$$

$$T'(i)=T(i-1)T(i)+R_\beta(i-1)R_\tau(i)T(i-1)T(i) \qquad \text{EQN 6d}$$

Image composition with Painters algorithm and alpha blending requires 3 multiply accumulates, 3 multiplies and 1 subtract, or 7 operations per layer, per pixel for every pixel in an image. The two term ART◊IM approximations require 9 multiply accumulates and 9 multiplies, or 18 operations per composed object or layer, per pixel in an image. The exact ART◊IM solutions require 9 multiply accumulates, 15 multiplies, and 3 inversions, or 27 operations per composed object or layer, per pixel in an image.

Though the cost for combining each pixel in the ART◊IM is two to four times greater than that of the Painters and alpha blend approach, the ART◊IM algorithms can be applied from the top down until either an opaque object or layer is reached, or the opacity of a layer reaches some predefined threshold value, thus significantly reducing the total number of computations in image composition with the ART◊IM. Thus, the composition of complex multi-layered images (as in animation and multimedia) will require fewer overall computations. In addition, the ART Image Model yields an attendant increase in imaging quality and a natural metaphor for imaging that is easier for the artist to apply and will easily extend to 3D imaging.

CAPTURING IMAGES IN THE ART IMAGE DATA FORMAT

Figure 14:
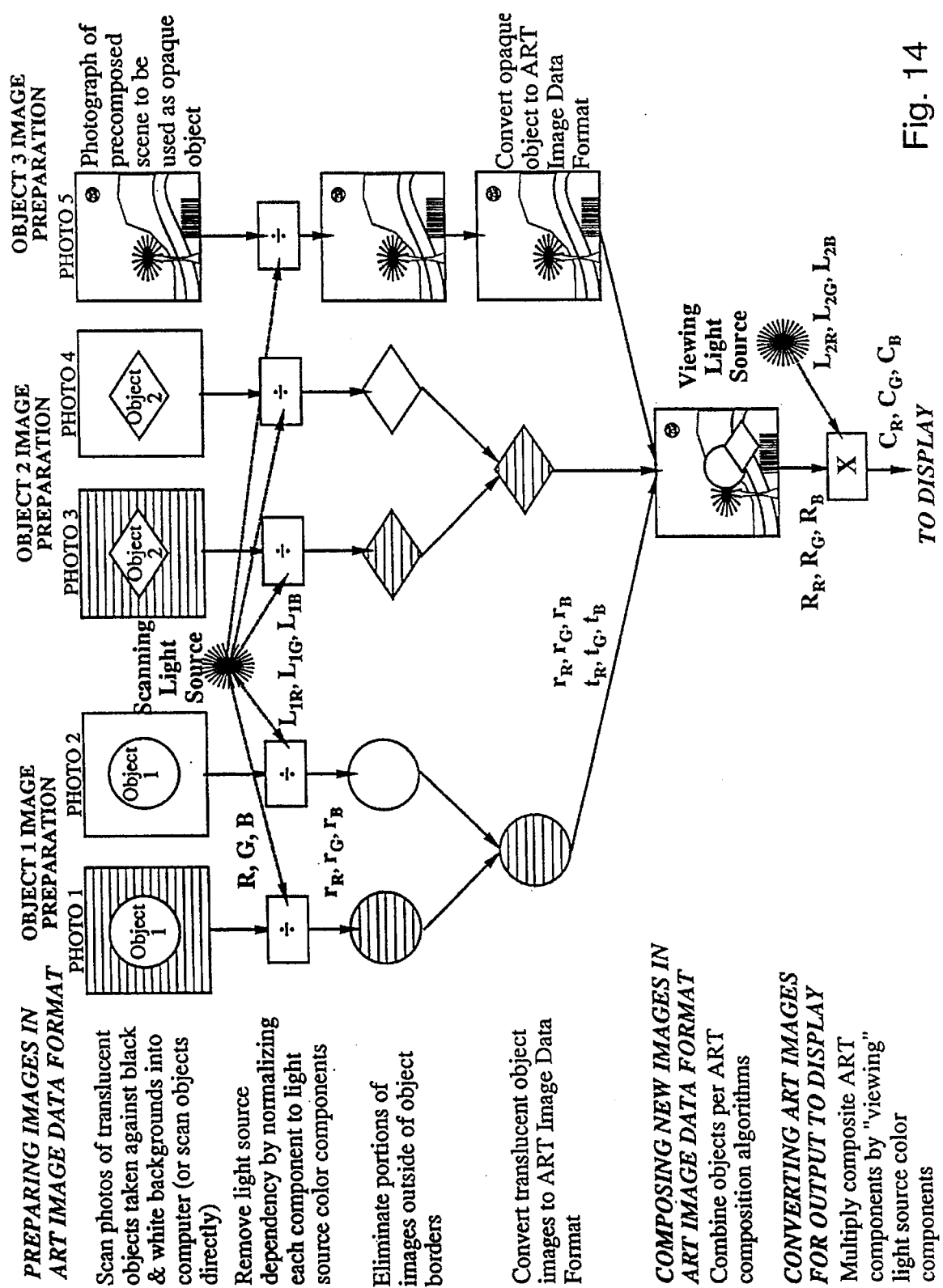
FIGS. 14 and 15 are diagrams illustrating methods in accordance with the present invention.

Since ART Images are defined in an entirely new format that is independent of light source color and can include measured information about the transparency of image objects, a special process is required to capture images of real objects in the ART Image Data Format. In one embodiment of this process (FIG. 14), object images are initially captured by either photographing and scanning their photographs into a computer, or by directly scanning the object's images into a computer.

In place of the traditional process of scanning a single photograph of an object to create an image data file, this embodiment of the ART image capture process uses two photographs of each object. One photograph is taken with the object posed in front of a non-reflecting black background, while another is taken with it posed in front of a totally reflecting white background. The color data is then scanned into the computer from these photographs in a standard color data format (like "RGB"), and then converted to a light source independent format by normalizing each component with the light source color for that component. If the object is small enough to fit on an image scanner, direct scans of an object against black and white backgrounds can be substituted for the photographs.

The light source independent image data for the two object scans is then clipped to remove the portions of the backgrounds outside of the object borders, and then combined into a single image file in the ART image Data Format per the ART algorithms and methods. Once in this format, object images stored in the ART Image Data Format can then be combined into a composite image by implementing the ART algorithms. Finally, when the final composite image has been completed, the light source independent ART components are multiplied by the color components of a selected viewing light source to convert them into displayable color components. A detailed description of the conversion of the RGB image data from two photographs of an object (against white and black backgrounds) into the ART Image Data Format is provided below.

Figure 15:
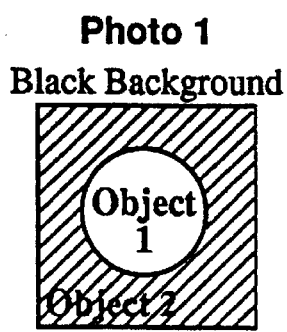
Figure 15:
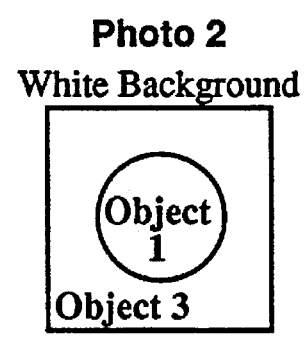

The Two Layer Model Algorithms described above will now be used to define the conversion of two photographs of an object scanned in RGB data format, to the ART Image Date Format. The data files (in RGB format) for an object that has been photographed against black and white backgrounds are represented in pictorial form in FIG. 15. In the photo on the left the object has been photographed against a black background. This insures that all light that is transmitted through the object is absorbed by the background and not reflected back through the object to combine with the light that is directly reflected back to the camera by the object. Thus, the measured light (scanned image data of object in photo 1) consists only of the light that is directly reflected by the object.

In contrast, photographing the object against a white background insures that all light transmitted through the object is reflected back upward through the object. Thus the measured light in this case consists of both the light that is directly reflected by the object, and the light that is transmitted through it, reflected by the background and re-transmitted through it again.

The unknown ART transformation components for Object 1 in photo 1 (black background) are $r(1)$ and $t(1)$. Since $a(1)=1-r(1)-t(1)$, the absorption of light by object $a(1)$ is treated implicitly and not calculated in this application.

On the other hand, the reflection, transmission and absorption transformation components of the black background itself are known because of its properties. They are:

$r(2)=0$, $t(2)=0$, $a(2)=1$ because it absorbs all light that strikes it.

Setting $R_\tau$ in Equation 1a equal to the light source normalized RGB value (at one pixel) of the Object in Photo 1:

$$\text{EQN 8: } R_\tau = \text{Photo } 1_{RGB} = r(1) + \left\{ \frac{r(2)t(1)^2}{1-r(1)r(2)} \right\}$$

but since the reflection of the black background is zero, or $r(2)=0$, this expression simplifies to:

$$R_\tau = \text{Photo}1_{RGB} = r(1) \qquad \text{EQN 8a}$$

Thus, the reflection transformation component of the Object $r(1)$ is just the measured RGB values of the Object's image captured against a black background. Since the black background's transformation components $r(2)$ and $t(2)$ equal 0, Equations 2a and 3a will result in $R_\beta=0$ and $T=0$ for Photo 1.

Setting equation 1a equal to the measured value (at one pixel) of Object 1 photographed against a white background in Photo 2, we have:

$$\text{EQN 9: } R_\tau = \text{Photo}2_{RGB} = r(1) + \left\{ \frac{r(3)t(1)^2}{1-r(1)r(3)} \right\}$$

where Photo$2_{RGB}$ is the light source normalized RGB value (at one pixel) of the object in Photo 2. Since the reflection, transmission and absorption transformation components of the white background in Photo 2 are:

r(3)=1, t(3)=0, a(3)=0, Equation 9 simplifies to:

EQN 9a: $R_\tau = \text{Photo2}_{RGB} = r(1) + \left\{ \dfrac{r(1)^2}{1-r(1)} \right\}$ Next since r(3)=1 and t(3)=0, by Equations 2a and 3a, $R_\beta$=1 and T=0 for Photo 2. Finally, substituting the value of r(1) from Equation 8a into Equation 9a yields:

EQN 10: $\text{Photo2}_{RGB} = \text{Photo1}_{RGB} + \left\{ \dfrac{r(1)^2}{1-\text{Photo1}_{RGB}} \right\}$ Solving Equation 10 for t(1) yields:

$t(1) = \{(\text{Photo2}_{RGB} - \text{Photo1}_{RGB})(1-\text{Photo1}_{RGB})\}^{1/2}$  EQN 11a Thus, to covert two images of an object from an RGB image data format to the ART image data format, the reflection transformation components r(1) of the object are just equal to the light source normalized RGB value of the object photographed or scanned against a black background, and the transmission transformation components of the object t(1) are defined by equation 11.

This example does not deal with the bias that results from using non-ideal black and white backgrounds that do not absorb and reflect (respectively) 100% of the light that strikes them. If more precise results are required, two additional images (of the black and white backgrounds alone) can be captured and used to yield a correction factor to compensate for this bias error.

ART IMAGING SYSTEM

There are many different ways that a system based on the ART Imaging Model and algorithms could be implemented depending on the application and the image composition speed required. The method of implementing an ART system could be comprised of only hardware, a combination of hardware and firmware, a combination of hardware, firmware and software, or even be implemented entirely in software. In order to simplify the description of the system presented here, it is defined as a processes that sequentially operates on a single pixel from each object (or layer) in vertical alignment (see FIG. 4). Thus, this system starts with the top most object pixel and combines it with the next one immediately beneath it, then proceeds to combine it with the pixel in the next layer below that, and so on, until all of the required pixels have been combined into a final display pixel. Though this system is defined as a single pixel process, in a practical implementation a full image would be computed by combining all of pixels in a given layer before the contribution of the next layer is computed.

Figure 16:
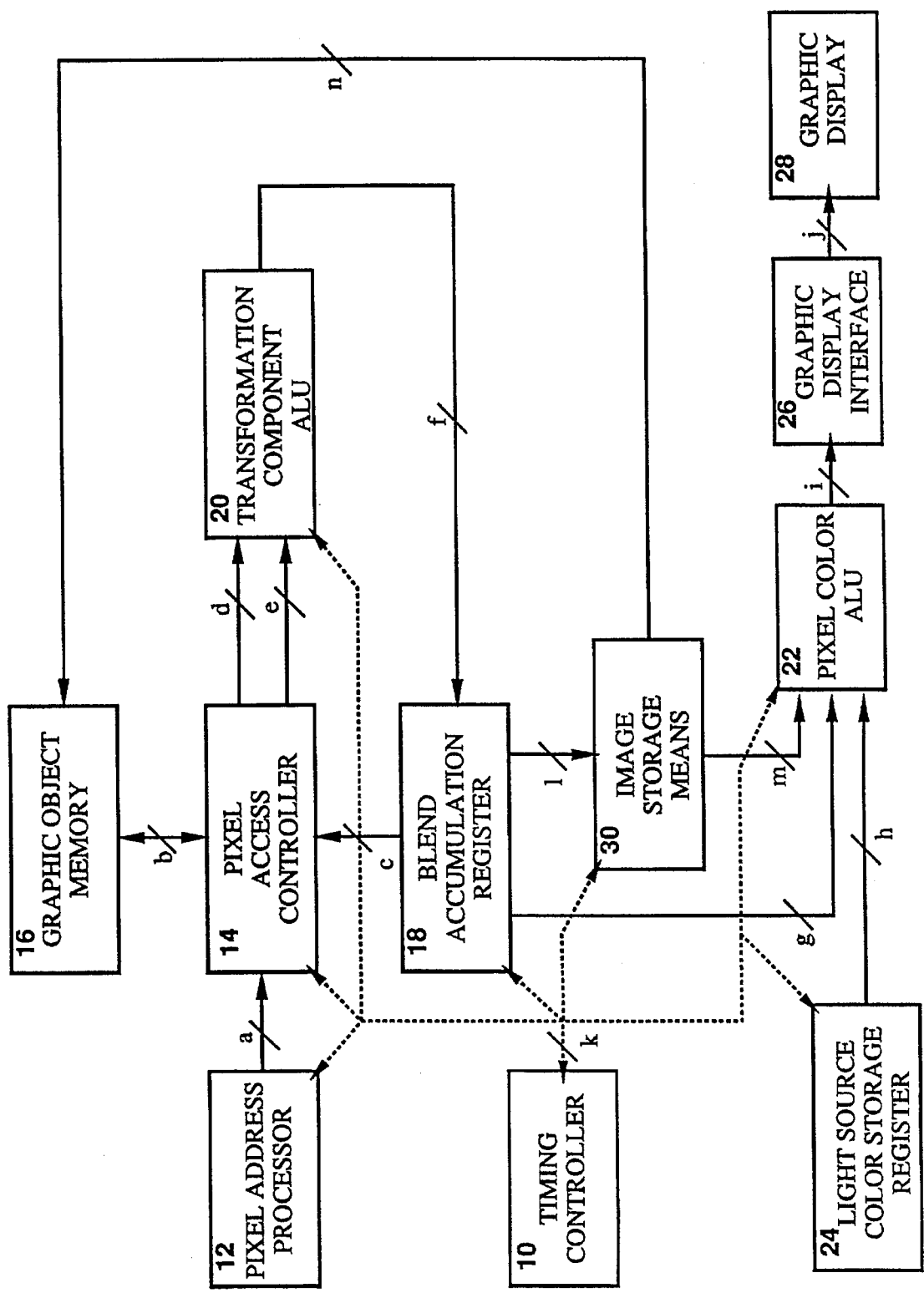
FIG. 16 is a functional block diagram illustrating an imaging system in accordance with the present invention.

A functional block diagram of a system to implement the ART algorithms is shown in FIG. 16. This system would operate in the following manner. The Timing Controller (10) initiates the image composition process by directing (over connection "k") the Pixel Address Processor (block 12) to identify next new pixel of the top-most object to be added to the image. The Pixel Address Processor determines the location or address at which this new pixel is stored in the Graphic Object Memory (16) and passes this address to the Pixel Access Controller (14) over connection "a".

The Timing Controller (10) then causes the Pixel Access Controller to read over connection "b" the transformation components for this new pixel from the Graphic Object Memory (16) and the extended transformation components ($R_{\tau RGB}$, $R_{\beta RGB}$, $T_{RGB}$) for the previously composed or accumulated pixels (combined objects above) from the Blend Accumulation Register (18). If the new object being added to the scene is a single layer object, the format of the transformation components passed over connection "b" is that of a single layer object, or $r_{RGB}$, $\tau_{RGB}$ (as shown for the single layer being combined with the virtual layer in FIG. 9). If the new object being added to the scene is already a multilayered object, then the format of the components read over connection "b" is $R_{\tau RGB}$, $R_{\beta RGB}$, $T_{RGB}$. Next, the Timing Controller (10) causes the Pixel Access Controller to present the new pixel and the accumulated pixel to the Transformation Component ALU (20) over connections "d" and "e".

The Timing Controller (10) then directs the Transformation Component ALU (20) to perform the calculations defined in Equations 4a, 5a and 6a to generate the new values for the transformation components ($R_{\tau RGB}$, $R_{\beta RGB}$, $T_{RGB}$). These new values include the effects of the new pixel blended with the other pixels already combined there. The Timing Controller (10) then completes one complete pixel blend cycle by causing the Transformation Component ALU (20) to write these new transformation components back into the Blend Accumulation Register (18).

The Timing Controller (10) continues to cycle down through all of the pixels in this manner until it receives an indication from the Pixel Address Processor (12) via connection "k" that the bottommost pixel has finally been added, or an indication from the Pixel Access Controller (14) via connection "k" that the accumulated pixel has reached a threshold level of opacity (very little transparency) so that blending in the next pixel below will contribute very little to the final image. The Timing Controller (10) then causes (via connection "k") the Blend Accumulation Register (18) to write out the reflection transformation component ($R_{\tau RGB}$) of the composite pixel to the Pixel Color ALU (22) via connection "g". This component is the total reflection of the image at the pixel just calculated and once it is converted from a transformation component to a color it will be what the viewer sees. It also causes (via connection "k") the Light Source Color Storage Register (24) to pass the light source color value to the Pixel Color ALU (22) via connection "h".

Next, Timing Controller (10) causes (via connection "k") the Pixel Color ALU (22) to calculate the pixel color from its transformation components and the light source color by Equation 7. Finally Timing Controller (10) causes the Pixel Color Alu (22) to output the pixel color (via channel "k") to the Graphic Display Interface (26) via channel "i", where it is formatted for the Graphic Display (28). The Graphic Display Interface (26) then passes the pixel color information in turn to the Graphic Display (28) via connection "j".

Though this system defines a single pixel process, in a practical implementation a full image could be computed by combining all of pixels in a given layer before the contribution of the next layer is computed.

Multi Layer objects or scenes that have been composed by the ART System can be stored in the Complex ART Image Data Format to retain all of the transformation component information for these compound images. This allows the ART system to use these compound images as building blocks for even more complex images.

When intermediate storage of scenes composed by the ART System is desired, the Timing Controller (10) directs the Blend Accumulation Register (18) to output the complete set of transformation components ($R_{\tau RGB}$, $R_{\beta RGB}$, $T_{RGB}$) to a Composed Image Storage Means (30). This Composed Image Storage Means can take the form of any digital storage system including, but not limited to, magnetic tape, magneto optic disk, optical disks, and solid state memory (RAM, ROM, EPROM, Flash, etc.).

The composed or partially composed images stored in the Composed Image Storage Means can be used at a later time to either play back the stored images, or to be combined with other objects stored in the Graphic Object Storage Memory (16) to yield a new composed image.

To play back previously composed images that are stored in the Composed Image Storage Means, the Timing Controller (10) causes the Composed Image Storage Means via connection 'k' to output the reflection transformation components ($R_{\tau RGB}$) of those images to the Pixel Color ALU (22) via connection "m", and repeats the control process described above for displaying the image. In order to naturally change the appearance of these images under different lighting conditions (e.g., change from a midday sun to a setting sun), a new light source color is stored in the Light Source Color Storage Register (24).

If additional objects must be added to previously composed images stored in the Composed Image Storage Means (30), the Timing Controller (10) causes the Composed Image Storage Means to output the images to the Graphic Object Image Storage Means (16) via connection 'n'. Whereas, these compound images are in the Complex ART Image Data Format, many of the graphic objects stored in the Graphic Object Storage Means are in the Simple ART Image Data format.

Figure 17:
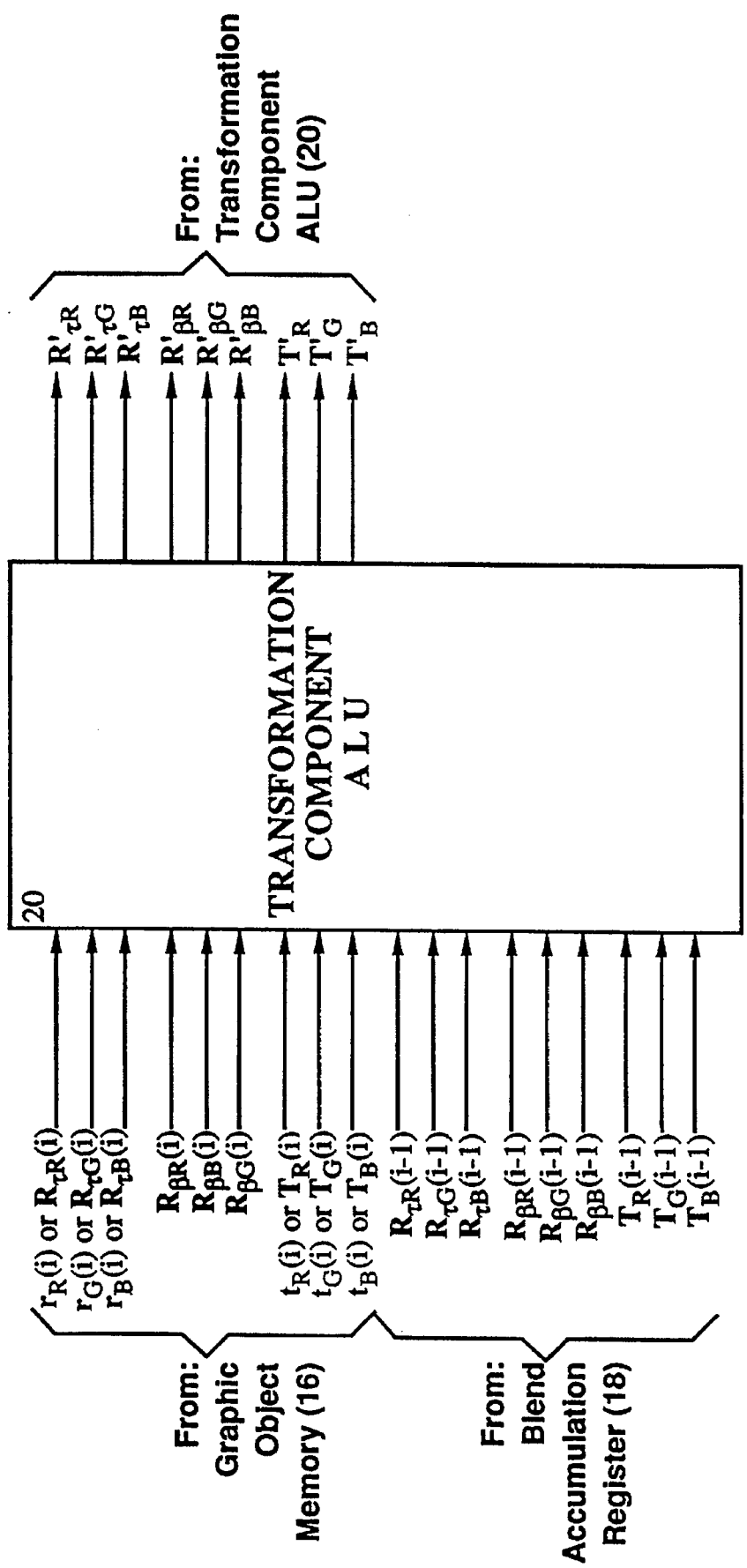
FIGS. 17–20 illustrate arithmetic logic unit schematics in accordance with the present invention.

The Transformation Component ALU (20) receives its inputs from the Graphic Object Memory (16) and the Blend Accumulation Register (14) via the Pixel Access Controller (14) (FIG. 17). Here the inputs from the Graphic Object Memory are either $r_{RGB}$, $t_{RGB}$ (simple ART Image Data Format) if the object is a single layer object, or $R_{\tau RGB}$, $R_{\beta RGB}$, $T_{RGB}$ (complex ART Image Data Format) if the new object is itself a multi-layer object or virtual layer. The inputs from the Blend Accumulation Register (the accumulated image to this point) are $R_{\tau RGB}$, $R_{\beta RGB}$, $T_{RGB}$. The newly calculated pixel value at the output of the Transformation Component ALU is also in the complex ART format.

Figure 18:
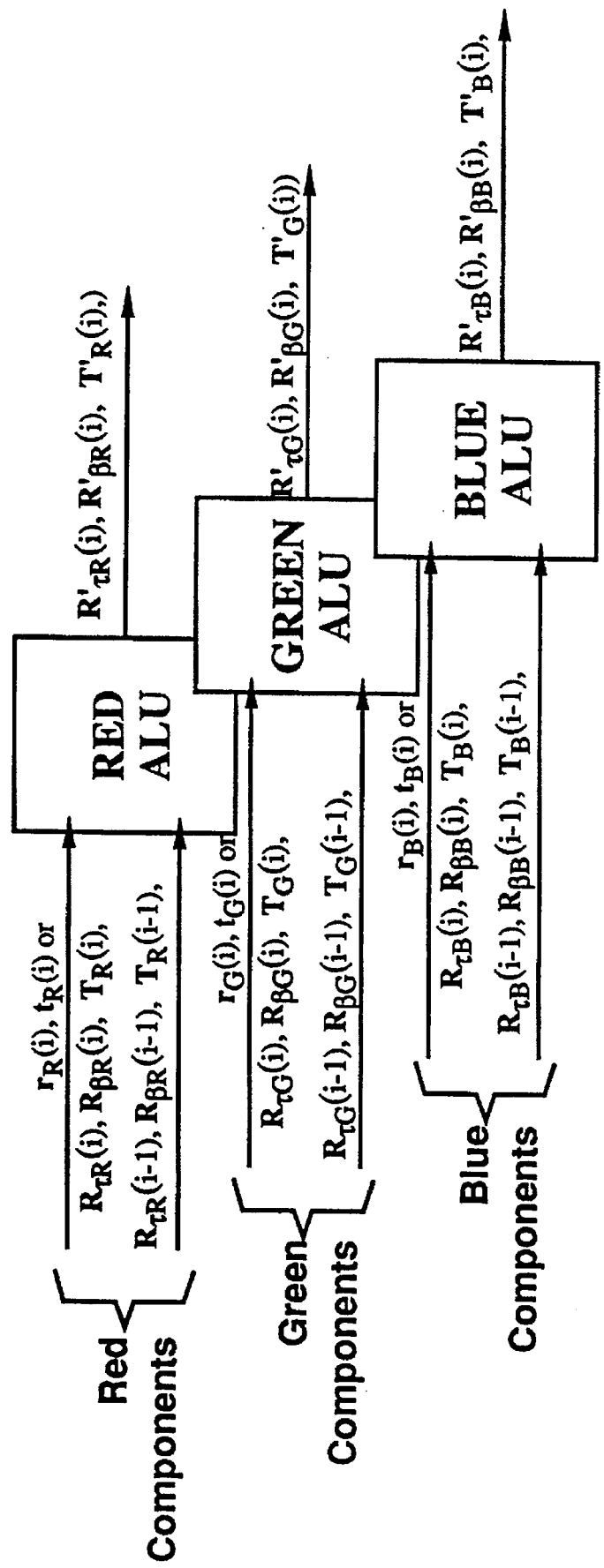

Internally, the Transformation Component ALU (TCALU) can be made up of from one to four arithmetic logic units, depending on the number of color components in the chosen color model and the amount of parallelism that is desired. In a fully parallel design based on the RGB color model there would be 3 ALUs with each one performing the ART computations (equations 4a, 5a & 6a, or 4b, 5b & 6b) on a separate color component of the pixel being processed (FIG. 18).

Figure 19:
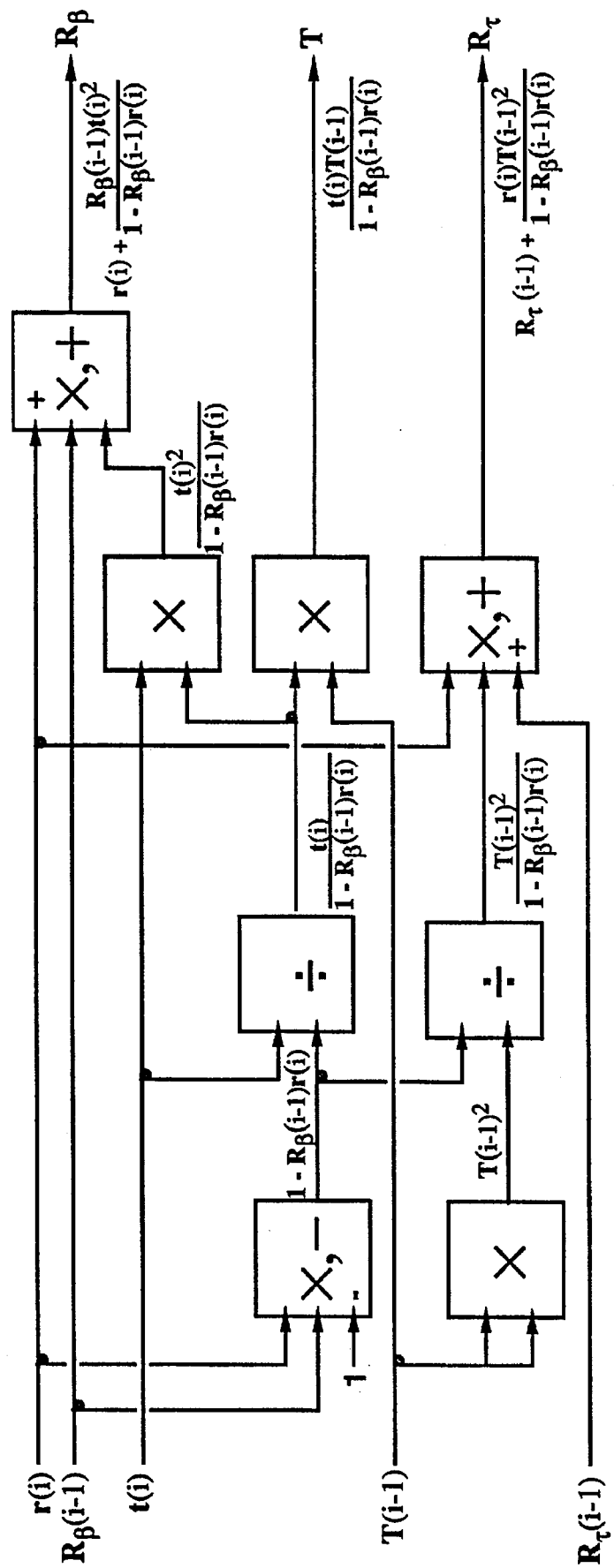

In a pipelined design, the internal structure of an individual TCALU (FIGS. 19 and 20) can consist of arithmetic units connected in series and parallel to perform the ART calculations. FIG. 19 demonstrates the calculations for adding a real (single layer) object to an image (Real Object Composition Equations 4a, 5a, and 6a), while FIG. 20 demonstrates the calculations for adding a virtual object to an image (Virtual Object Composition Equations 4b, 5b and 6b).

Figure 20:
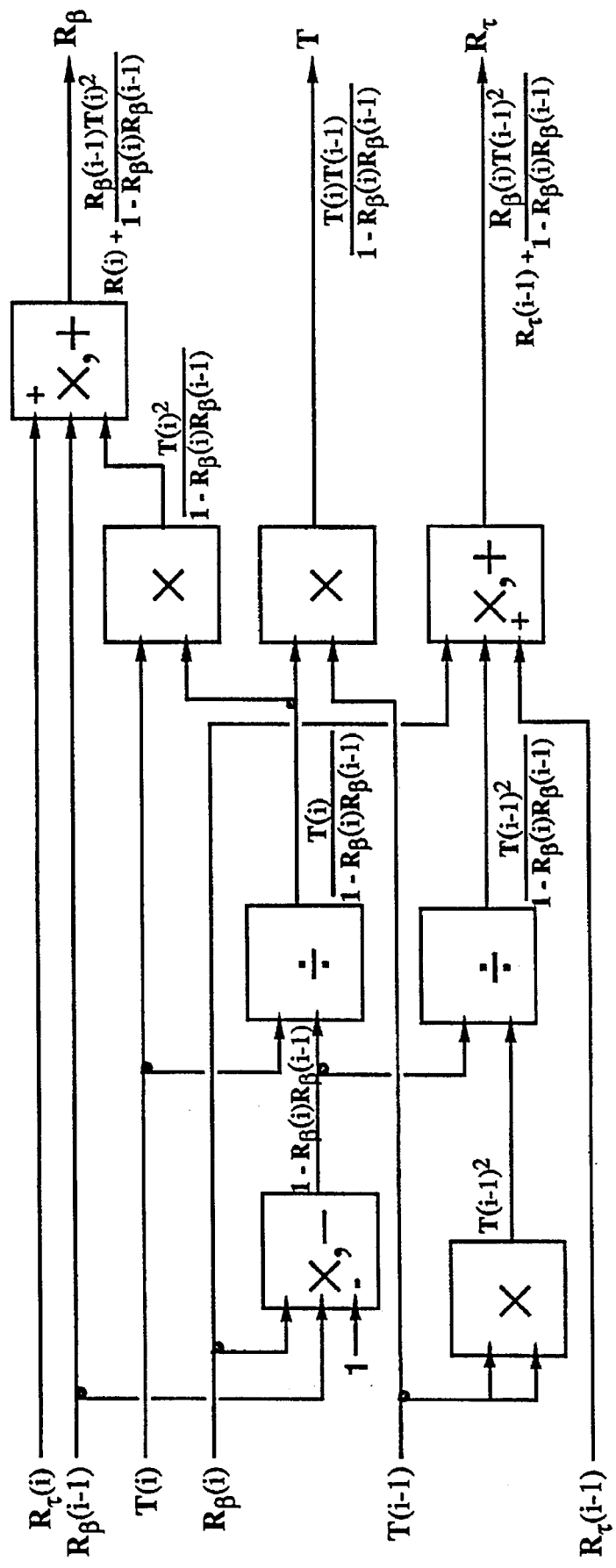

These examples illustrate one method for rapidly computing the ART Imaging algorithms for an RGB color model. As can be seen from the diagrams, the total number of operations to perform both real and virtual object composition would be 27 multiply equivalents (9 each for Red ALU, Green ALU and Blue ALU). If the same structure as shown in FIGS. 19 and 20 is used with the Two Term Real and Virtual Object Composition Equations, the total number of computations would be 18 multiply equivalents. If the speed of computation is not critical, one TCALU could be used to compute the transformation coefficients of each color component in turn. In addition, one arithmetic unit together with internal storage registers unit could be used inside the TCALU to develop each partial term in turn until the final terms are computed.

As can be seen from these figures, the computation required to develop an exact solution (per the ART Imaging Model), representing the blend of two pixels, requires five multiplies, three multiply-accumulates and one inversion per color component. Thus, combining two pixels into a composite pixel requires twenty seven arithmetic operations. If just two layers are composed, this is nearly four times the number of operations that are required to compose these layers by the Painter's algorithm & alpha blend approach. On the other hand, if five layers are composed and the topmost layer is predominantly opaque except for anti-aliasing around the edges of the objects and/or text, then the ART composition process would require fewer operations to compose the complete image. If an image is composed of many layers, of which most are predominantly opaque (like images in every day life) the ART composition process would require a small fraction of the number of computations that of any composition algorithm based on Painter's Algorithm.

ALGORITHMS

Figure 21:
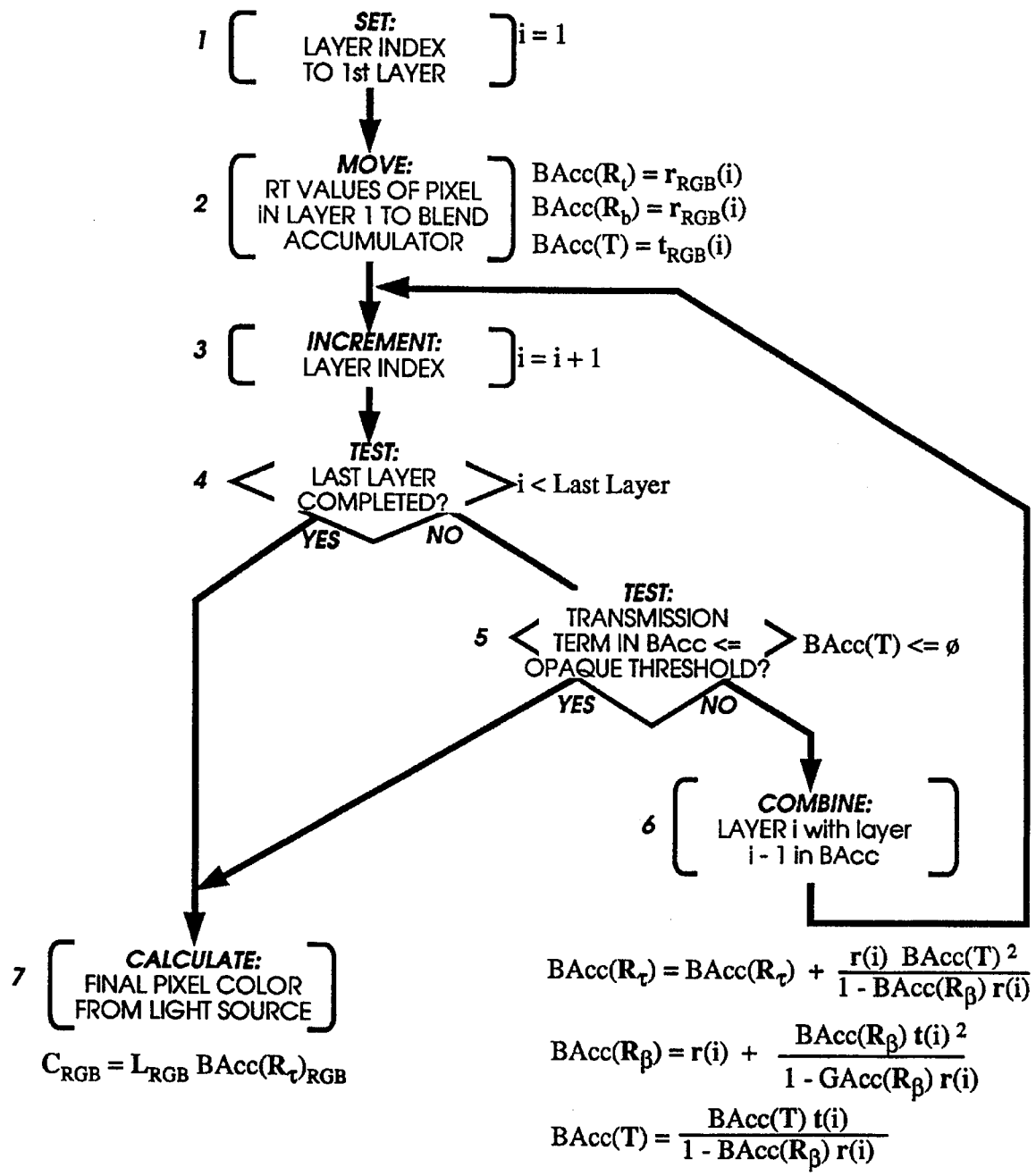
FIG. 21 is a logic flow chart illustrating operation of the preferred embodiment.

The algorithms used in the ART ◊ IM are illustrated in flow chart form in FIG. 21 and by way of an example in FIG. 21. In order to simplify the description of the algorithms, these examples are intended to illustrate the process of composing a single pixel from the pixels that lie beneath it in the layers, but in practice would be implemented in parallel to compose an entire line segment from the segments that underlie it in object layers below.

The initial steps in a typical implementation would be to {1} initialize a Layer Index to the topmost layer, {2} move the transformation values ($r_{RGB}$, $t_{RGB}$) for the pixels on that layer into a Blend Accumulator (BAcc), and {3} increment the Layer Index to the next layer.

Next, two tests are performed. The first test {4} compares the Layer Index to the index of the bottommost layer to provide an exit to the layer composition when all the layers have been processed. The second test {5} compares the total transparency of the pixel (T) to a minimum Opaque Threshold value (e.g. 98%) to end processing of lower layers when their contribution becomes very small. This mechanism provides a means for the top-down composition to avoid processing (reading, blending and writing) large amounts of image data that will not be seen or will have a very small effect on the image.

Finally, information for the new layer is accessed and combined {6} (by the ART ◊ IM algorithms in the previous section) with the layer(s) already contained in the Blend Accumulator. When the last layer has been processed, the Light Source color (L) is used together with the cumulative reflection {7} at this element to calculate the color to be displayed.

Figure 22:
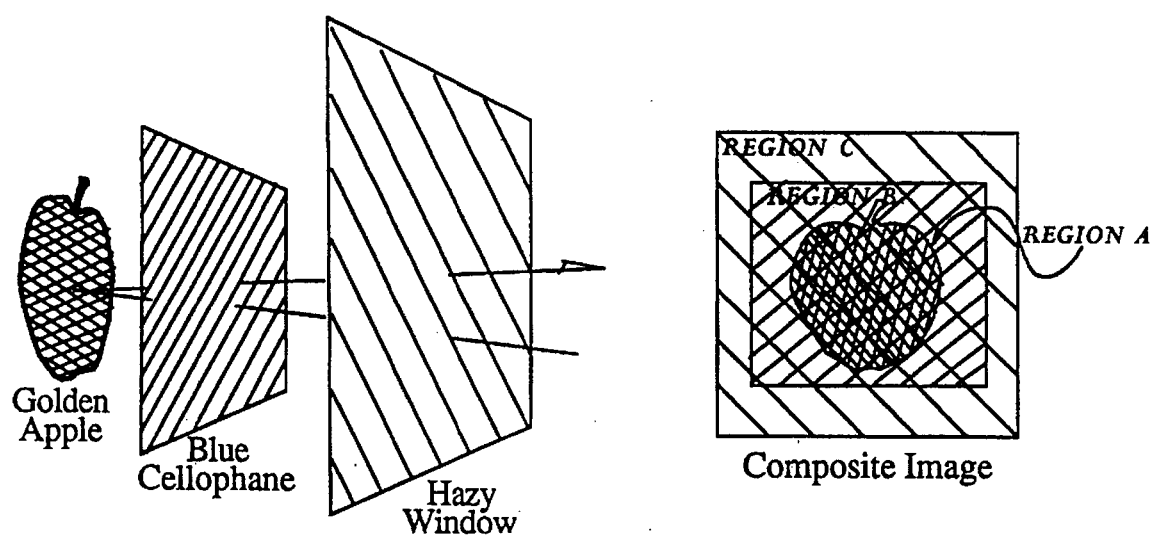
FIG. 22 is a diagram illustrating image composition in accordance with the present invention.

The scenario on the left side of FIG. 22 represents a scene to be composed by the ART ◊ IM algorithms. This scene consists of a light source generating light which propagates through a hazy window, through blue cellophane, reflects off a golden apple, and reemerges to the viewer after passing back through the cellophane and window.

Tables 1, 2 and 3 illustrate the ART ◊ IM calculations for the three regions in the fully composed scene shown on the right side of FIG. 22. The first row in Table 1 contains the RGB value of the light source, that is used to convert the final blends ($R_{\tau RGB}$) in Table 2 into the final colors displayed in Table 3. The balance of Table 1 contain the transformation components of the objects in the scene represented as percent reflection, transmission, and absorption.

TABLE 1

| | Transfer Properties of Objects (in percent) | | | | | | | | | |
|---|---|---|---|---|---|---|---|---|---|---|
| | r | | | t | | | a | | | |
| | R | G | B | R | G | B | R | G | B | |
| Light Source | 255 | 255 | 235 | | | | | | | |
| Hazy Glass | 0.04 | 0.03 | 0.02 | 0.94 | 0.96 | 0.94 | 0.02 | 0.01 | 0.04 | Low reflection, high transmission |
| Blue Cellophane Film | 0.00 | 0.00 | 0.04 | 0.96 | 0.95 | 0.92 | 0.04 | 0.04 | 0.04 | Low reflection, high transmission |
| Yellow Opaque Apple | 0.60 | 0.69 | 0.11 | 0.00 | 0.00 | 0.00 | 0.40 | 0.31 | 0.89 | No transmission |

Table 2 shows the intermediate values of the Blend Accumulator (BAcc) as each object is composed. Here, the topmost layer (Hazy Glass) is read into the Blend Accumulation Register in Blend 0, and Blends 1 and 2 successively add in the blue cellophane and golden apple. Thus, the values of the transformation components in each row represent the blend of all of the objects or layers above with the object in that row. Table 3 shows the conversion of the final transformation coefficients in the three regions to RGB colors.

TABLE 2

| | Calculations for Apple Behind Blue Cellophane Scene | | | | | | | | | |
|---|---|---|---|---|---|---|---|---|---|---|
| | Rτ | | | Rβ | | | T | | | |
| | R | G | B | R | G | B | R | G | B | |
| Blend 0 | 0.04 | 0.03 | 0.02 | 0.04 | 0.03 | 0.02 | 0.94 | 0.96 | 0.94 | Copy r,t values for Hazy Glass |
| Blend 1 | 0.04 | 0.04 | 0.06 | 0.04 | 0.04 | 0.06 | 0.90 | 0.91 | 0.87 | Blend in Blue Cellophane |
| Blend 2 | 0.54 | 0.63 | 0.14 | 0.61 | 0.70 | 0.11 | 0.00 | 0.00 | 0.00 | Blend in Gold Apple |

TABLE 3

| | Conversion of Final Blend to RGB Colors | | | | | | | | |
|---|---|---|---|---|---|---|---|---|---|
| | Rτ | | | Rβ | | | T | | |
| | R | G | B | R | G | B | R | G | B |
| Region C | 10 | 8 | 5 | | | | | | Color of Hazy Glass |
| Region B | 10 | 11 | 13 | | | | | | Color of Glass & Cellophane |
| Region A | 138 | 160 | 32 | | | | | | Color of Glass, Cellophane & Apple |

CONCLUSION

The fundamental difference between image composition with the ART Imaging Model and the Painters Model is that the data representation in ART imaging (transformation components) records not just the color of objects, but how they interact with light. This yields an image representation that is light source independent and allows the lighting of final composed scenes to be dynamically changed yielding a result that is natural and expected. In addition, image composition with the ART Imaging Model can be implemented from the top down. Thus, the most important parts of an image (top layer) are composed first with subsequently less important layers combined in turn. This allows a wide range of implementations to optimize for image composition speed or quality depending on imaging system requirements.

Figure 23:
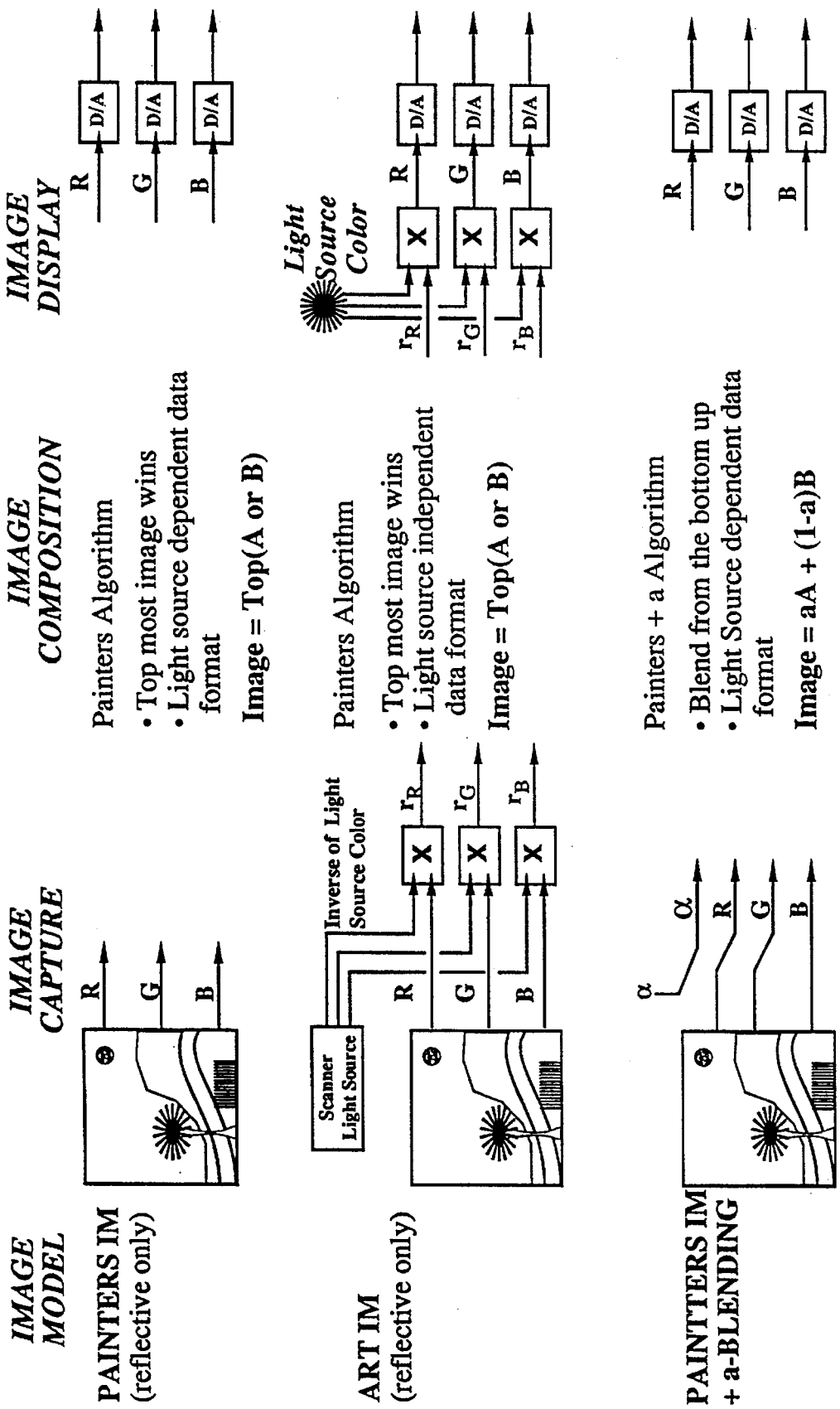
FIG. 23 is a diagram schematically comparing various embodiments of the present invention with prior art imaging methods.
Figure 23:
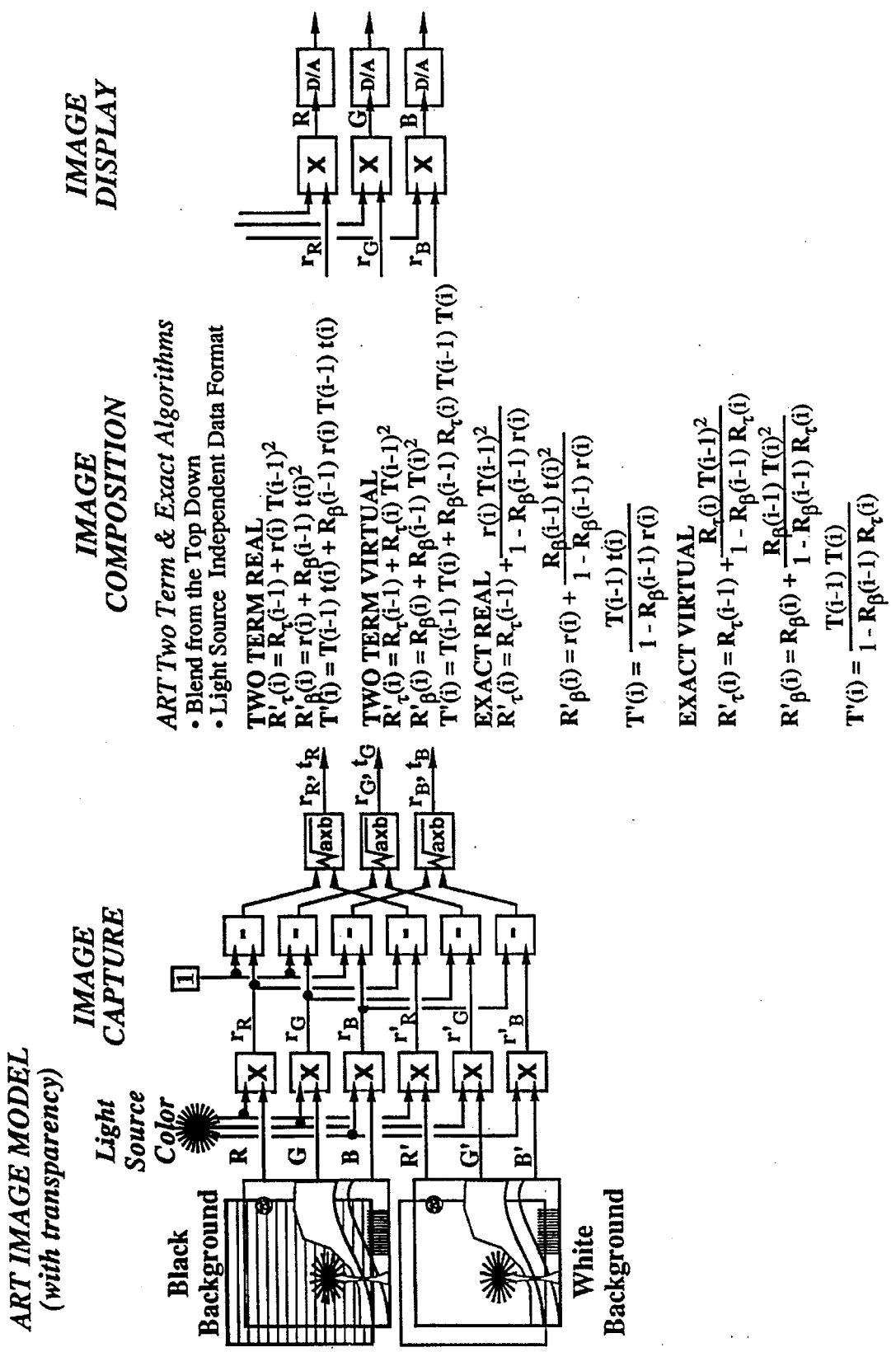

Three ART imaging implementations and two of the Painters implementations are illustrated in FIG. 23. In the ART and Painters reflective only implementations (top two cases), composition of images is performed via Painters algorithm. The difference between these implementations is the light source independence of the ART Image Data format. This allows images captured under different lighting conditions to be more easily composed, and allows the lighting of the final scene to be dynamically changed.

When transparency is added to the Painters Model (third case), an "α" term is added to the color components to represent the transparency of images. Image composition is then performed from the bottom via the alpha blending algorithm.

In the Two Term and Exact ART implementations (bottom case), captured image data is normalized to extract the light source dependency and then converted to the transformation components of the ART Image Data format. Images are then composed from the top down by either the Two Term or Exact ART algorithms.

There are two primary ways in which the low level architecture of an imaging system based on the ART Imaging Model differs from those based on other imaging models. The first is the data format that is used for intermediate storage and composition of images. These data formats are chosen to efficiently fit within byte, word and long word boundaries in order to minimize storage and processing by the low level graphics system just prior to image composition and display. These storage formats, as well as the video composition hardware & software may use more or less bits to define each component depending on the requirements for image manipulation speed and accuracy of image representation. As well, these data formats may be changed to render them compatible with various graphic output devices like a video display or a printer. Table 4 illustrates the data formats typically used in current imaging systems together with potential ART ◊ IM formats.

TABLE 4

Comparison of Image Data Formats

| Data Formats: | PAINTERS + BLEND (RGB, α) | ART◇IM ($r_R$ $r_G$ $r_B$, $t_R$ $t_G$ $t_B$) |
|---|---|---|
| 24 Bit Direct Color/ Transformation Component | (888, 8) 0.4% blend/ step 32 bit word | (888, 888) 0.4% blend/step 48 bit word |
| 24 Bit Direct Color | | (888, 222) 25% blend/step 32 bit word |
| 18 Bit Direct Color | (666, 6) 1.6% blend/ step 24 bit word | |
| 16 Bit Direct Transformation Component | | (555, 555) 3% blend/step 32 bit word |
| 16 Bit Direct Color/ Transformation Component | (555, 8) 0.4% blend/ step 24 bit word | (555, 333) 12.5% blend/step 24 bit word |
| 16 Bit Direct Color | (555, 1) 0 or 100% blend 16 bit word | |
| 9 Bit Transformation Component Table Lookup | | (333, 222) 25% blend/step 16 bit word |
| 8 Bit Color Table Lookup | (8, 8) 0.4% blend/ step 16 bit word | |

The second way in which an ART Imaging system differs is in the number of computations that are required for each pixel that is composed (Table 5).

TABLE 5

Comparison of Computation Requirements

| | PAINTERS + BLEND | ART◇IM (2 term Approx.) | ART◇IM (Exact Solution) |
|---|---|---|---|
| Operations/Pixel: (to compose 2 layers) | 3 Multiply Accumulates<br>3 Multiples<br>1 Subtract | 9 Multiply Accumulates<br>9 Multiplies | 9 Multiply Accumulates<br>15 Multiplies<br>3 Inverses |
| | 7 Operations | 18 Operations | 27 Operations |

Here it is clear that on a per pixel basis the ART◇IM implementations require 2.6 and 3.9 times the number of computations required in a Painters Alpha blend system. However, the ART algorithm is able to test the composed pixel's transparency as each layer is added in order to determine if they are opaque per a predefined threshold value, and thus end further processing of lower layers when an opaque layer is reached.

The ART Imaging Model and its algorithms provide a unique technique for composing images from the top down. The advantages of the ART methods over those currently used are:

Light Source Independence—objects are described by how they transform the light interacting with them and are light source independent. As the color of the light source in a scene changes, the appearances of the objects in a scene change automatically (no additional computation) in a natural, realistic way as the image is recomposed.

Built-In Transparency—transparency is a natural, inherent part of the model and algorithms, making it easy to render objects with transparency or translucency and dynamically anti-alias all objects as they are animated. Special alpha layers, or alpha fields in pixel color values (along with the attendant hardware and software complexity required to support them) are not needed.

Natural and Intuitive Metaphor—these algorithms, by modeling the way people perceive the world around them, make it significantly easier and more intuitive for an artist or composer to visualize a final composite image as he/she adds new layers or objects to an image.

Top Down Composition—these algorithms significantly reduce data bus loading and the computation required to compose scenes with many object layers, because their top down composition techniques eliminate the need to compose those portions of objects which are hidden behind other opaque objects. They allow graceful degradation of the image as the complexity increases (most important part of scene is composed first—viewer side), and they allow simplified implementation of digital video effects like object transparency, anti-aliasing, cross fading, self and color keying, and tiling.

Ideal Foundation for 3D Imaging—since the ART◇IM is built on a light ray tracing model, extension of its multiple layer 2D composition to 3D composition will be natural and metaphor consistent. These extensions may include adding directionality to the incident light, shading, and objects which extend across many layers. The ART◇IM benefit of top down composition (eliminating the need to compose the portions of objects hidden behind other opaque objects) will provide an even more dramatic reduction in the amount of data processing required for 3D imaging.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of developing and storing image data in the form of transformation components corresponding to each pixel of an object, comprising:

disposing the object in front of a background that is substantially totally absorptive of incident light;

illuminating said object;

measuring the percentage of incident light reflected from each pixel of the surface of said object in terms of a first set of at least three reflection transformation components $r_1$, $r_2$, $r_3$ each of which represents the reflected light value in terms of one color component of a predetermined color model;

disposing said object in front of a background that is substantially totally reflective of incident light;

illuminating said object with light;

measuring the percentage of incident light that appears to be reflected from each pixel of the surface of said object

19 in terms of a second set of at least three pseudo-reflection transformation components $r'_1$, $r'_2$, $r'_3$, each of which is proportional to the intensity of one color component of the predetermined color model;

using the relationship $$(t_1,t_2,t_3)=\{((r'_1,r'_2,r'_3)-(r_1,r_2,r_3))(1-(r_1,r_2,r_3))\}^{1/2}$$

to determine the transmission transformation components $t_1$, $t_2$, $t_3$ of each pixel; and storing the six transformation components $r_1$, $r_2$, $r_3$, $t_1$, $t_2$, $t_3$ corresponding to each pixel of the object.

2. A method as recited in claim 1 wherein said predetermined color model is an RGB data image format and wherein $r_1$, $r_2$, $r_3$ respectively represent the red, green and blue reflection transformation components, and wherein $t_1$, $t_2$, $t_3$ respectively represent the red, green and blue transmission transformation components.

3. A method as recited in claim 1, wherein said predetermined color model is selected from the group of image data formats consisting of RGB, HLS, YUV, Lab, HSV, YIQ, CMY and CMYK color components.

4. A method of combining two or more sets of previously stored image data to form a set of composite image data representing a composite image wherein a first image $I_1$ overlays at least a portion of a second image $I_2$, and wherein each pixel of said first image is defined by pixel data of the form $R_{1\tau}$, $R_{2\tau}$, $R_{3\tau}$, $R_{1\beta}$, $R_{2\beta}$, $R_{3\beta}$, $T_1$, $T_2$, $T_3$, where $R_{1\tau}$, $R_{2\tau}$, $R_{3\tau}$ are respectively the reflection transformation components corresponding to the light reflected back toward the observer for each color component of a predetermined color model, and $R_{1\beta}$, $R_{2\beta}$, $R_{3\beta}$ are respectively the reflection transformation components corresponding to the light reflected away from the observer for each color component of the predetermined color model, and $T_1$, $T_2$, $T_3$ are respectively the transmission transformation components corresponding to the transmitted light for each color component of the predetermined color model, the transformation components $R_\tau$ and $T$ being related according to the equation $R_\tau+T+A_\tau=1$ wherein the absorption transformation components $A_{1\tau}$, $A_{2\tau}$, $A_{3\tau}$ for light reflected back to the observer are implicit, the transformation components $R_\beta$ and $T$ being related according to the equation $R_\beta+T+A_\beta=1$ wherein the absorption transformation components $A_{1\beta}$, $A_{2\beta}$, $A_{3\beta}$ for light reflected away from the observer are implicit, and each pixel of said second image is defined by pixel data in the form $r_1$, $r_2$, $r_3$, $t_1$, $t_2$, $t_3$, where $r_1$, $r_2$, $r_3$ are respectively the reflection transformation components corresponding to each color component of the predetermined color model, and $t_1$, $t_2$, $t_3$ are respectively the transmission transformation components corresponding to each color component of the predetermined color model, the transformation components $r$ and $t$ being related according to the equation $r+t+a=1$ wherein the absorption transformation components $a_1$, $a_2$, $a_3$ are implicit, comprising:

combining the pixel data of said first image with the pixel data of said second image to develop first composite image data including composite pixel data in the form $R'_{1\tau}$, $R'_{2\tau}$, $R'_{3\tau}$, $R'_{1\beta}$, $R'_{2\beta}$, $R'_{3\beta}$, $T'_1$, $T'_2$, $T'_3$ representing the combined pixel data of overlaying pixels of the two images, the combination of overlaying pixel data being accomplished by solving the equations $$R'_\tau(i)=R_\tau(i-1)+r(i)T(i-1)^2,$$

$$R'_\beta(i)=r(i)+R_\beta(i-1)t(i)^2, \text{ and}$$

$$T'(i)=T(i-1)t(i)+R_\beta(i-1)r(i)T(i-1)t(i)$$

20 where (i−1) signifies the said first or topmost image layer or composite image layer $I_1$, (i) signifies the said second image layer or composite image layer $I_2$ laying immediately below (i−1), $R'_\tau(i)$ signifies collectively the composite reflection transformation components $(R'_{1\tau},R'_{2\tau},R'_{3\tau})$ for light reflected back to the observer from all layers above and including layer i, $R'_\beta(i)$ signifies collectively the composite reflection transformation components $(R'_{1\beta},R'_{2\beta},R'_{3\beta})$ for the light reflected away from the observer by all layers above and including layer i, and $T'(i)$ signifies collectively the composite transmission transformation components $(T'_1,T'_2,T'_3)$ for light transmitted in either direction by all layers above and including layer i; and determining the color values $C_1$, $C_2$, $C_3$ corresponding to each pixel in the final composite image by multiplying the reflection transformation components $R'_{1\tau},R'_{2\tau}$ and $R'_{3\tau}$ by light component values $L_1$, $L_2$ and $L_3$, where $C_1$, $C_2$, $C_3$ are the values used to display a pixel's color corresponding to each color component of a predetermined color model, and where $L_1$, $L_2$, $L_3$ are the measured light source color component values corresponding to each color component of a predetermined color model.

5. A method of combining two or more sets of previously stored image data to form a set of composite image data representing a composite image wherein a first image $I_1$ overlays at least a portion of a second image $I_2$, and wherein each pixel of said first image is defined by pixel data of the form $R_{1\tau}$, $R_{2\tau}$, $R_{3\tau}$, $R_{1\beta}$, $R_{2\beta}$, $R_{3\beta}$, $T_1$, $T_2$, $T_3$, where $R_{1\tau}$, $R_{2\tau}$, $R_{3\tau}$ are respectively the reflection transformation components corresponding to the light reflected back toward the observer for each color component of a predetermined color model, and $R_{1\beta}$, $R_{2\beta}$, $R_{3\beta}$ are respectively the reflection transformation components corresponding to the light reflected away from the observer for each color component of the predetermined color model, and $T_1$, $T_2$, $T_3$ are respectively the transmission transformation components corresponding to the transmitted light for each color component of the predetermined color model, the transformation components $R_\tau$ and $T$ being related according to the equation $R_\tau+T+A_\tau=1$ wherein the absorption transformation components for light reflected back to the observer $A_{1\tau}$, $A_{2\tau}$, $A_{3\tau}$ are implicit, the transformation components $R_\beta$ and $T$ being related according to the equation $R_\beta+T+A_\beta=1$ wherein the absorption transformation components for light reflected away from the observer $A_{1\beta}$, $A_{2\beta}$, $A_{3\beta}$ are implicit, and each pixel of said second image is defined by pixel data in the form $r_1$, $r_2$, $r_3$, $t_1$, $t_2$, $t_3$, where $r_1$, $r_2$, $r_3$ are respectively the reflection transformation components corresponding to each color component of the predetermined color model, and $t_1$, $t_2$, $t_3$ are respectively the transmission transformation components corresponding to each color component of the predetermined color model, the transformation components $r$ and $t$ being related according to the equation $r+t+a=1$ wherein the absorption transformation components $a_1$, $a_2$, $a_3$ are implicit, comprising:

combining the pixel data of said first image with the pixel data of said second image to develop first composite image data including composite pixel data in the form $R'_{1\tau}$, $R'_{2\tau}$, $R'_{3\tau}$, $R'_{1\beta}$, $R'_{2\beta}$, $R'_{3\beta}$, $T'_1$, $T'_2$, $T'_3$ representing the combined pixel data of overlaying pixels of the two images, the combination of overlaying pixel data being accomplished by solving the equations $R'_\tau(i)=R_\tau(i-1)+\{(r(i)T(i-1)^2)/((1-R_\beta(i-1)r(i))\}$, $R'_\beta(i)=r(i)+\{(R_\beta(i-1)r(i)^2)/(1-R_\beta(i-1)r(i))\}$, and $T'(i)=\{(T(i-1)r(i))/(1-R_\beta(i-1)r(i))\}$ where (i−1) signifies the said first or top most image layer or composite image layer $I_1$, (i) signifies the said second image layer or composite image layer $I_2$ laying immediately below layer (i−1), $R'_\tau(i)$ signifies collectively the composite reflection transformation components $(R'_{1\tau},R'_{2\tau},R'_{3\tau})$ for light reflected back to the observer from all layers above and including layer i, $R'_\beta(i)$ signifies collectively the composite reflection transformation components $(R'_{1\beta},R'_{2\beta},R'_{3\beta})$ for the light reflected away from the observer by all layers above and including layer i, and T'(i) signifies collectively the composite transmission transformation components $(T'_1,T'_2,T'_3)$ for light transmitted in either direction by all layers above and including layer i; and determining the color values $C_1$, $C_2$, $C_3$ of each pixel in the final composite image by multiplying the reflection transformation components $R'_{1\tau},R'_{2\tau}$ and $R'_{3\tau}$ by light component values $L_1$, $L_2$ and $L_3$, where $C_1$, $C_2$, $C_3$ are the values used to display a pixel's color corresponding to each color component of a predetermined color model, and where $L_1$, $L_2$, $L_3$ are the measured light source color component values corresponding to each color component of a predetermined color model.

6. A method of combining two or more sets of previously stored image data to form a set of composite image data representing a composite image wherein a first image $I_1$ overlays at least a portion of a second image $I_2$, and wherein each pixel of said first image and each pixel of said second image is defined by pixel data of the form $R_{1\tau}$, $R_{2\tau}$, $R_{3\tau}$, $R_{1\beta}$, $R_{2\beta}$, $R_{3\beta}$, $T_1$, $T_2$, $T_3$, where $R_{1\tau}$, $R_{2\tau}$, $R_{3\tau}$ are respectively the reflection transformation components corresponding to the light reflected back toward the observer for each color component of the predetermined color model, and $R_{1\beta}$, $R_{2\beta}$, $R_{3\beta}$ are respectively the reflection transformation components corresponding to the light reflected away from the observer for each color component of the predetermined color model, and $T_1$, $T_2$, $T_3$ are respectively the transmission transformation components corresponding to the transmitted light for each color component of the predetermined color model, the transformation components $R_\tau$ and $T$ being related according to the equation $R_\tau+T+A_\tau=1$ wherein the absorption transformation components $A_{1\tau}$, $A_{2\tau}$, $A_{3\tau}$ for light reflected back to the observer are implicit, the transformation components $R_\beta$ and T being related according to the equation $R_\beta+T+A_\beta=1$ wherein the absorption transformation components $A_{1\beta}$, $A_{2\beta}$, $A_{3\beta}$ for light reflected away from the observer are implicit, comprising:

combining the pixel data of said first image with the pixel data of said second image to develop first composite image data including composite pixel data in the form $R'_{1\tau}$, $R'_{2\tau}$, $R'_{3\tau}$, $R'_{1\beta}$, $R'_{2\beta}$, $R'_{3\beta}$, $T'_1$, $T'_2$, $T'_3$ representing the combined pixel data of overlaying pixels of the two images, the combination of overlaying pixel data being accomplished by solving the equations $R'_\tau(i)=R_\tau(i-1)+R_\tau(i)T(i-1)^2$, $R'_\beta(i)=R_\beta(i)+R_\beta(i-1)T(i)^2$, and $T'(i)=T(i-1)T(i)+R_\beta(i-1)R_\tau(i)T(i-1)T(i)$ where (i−1) signifies the said first or top most image layer or composite image layer $I_1$, (i) signifies the said second image layer or composite image layer $I_2$ laying immediately below (i−1), $R'_\tau(i)$ signifies collectively the composite reflection transformation components $(R'_{1\tau},R'_{2\tau},R'_{3\tau})$ for light reflected back to the observer from all layers above and including layer i, $R'_\beta(i)$ signifies collectively the composite reflection transformation components $(R'_{1\beta},R'_{2\beta},R'_{3\beta})$ for the light reflected away from the observer by all layers above and including layer i, and T'(i) signifies collectively the composite transmission transformation components $(T'_1,T'_2,T'_3)$ for light transmitted in either direction by all layers above and including layer i; and determining the color values $C_1$, $C_2$, $C_3$ of each pixel in the final composite image by multiplying the reflection transformation components $R'_{1\tau},R'_{2\tau}$ and $R'_{3\tau}$ by light component values $L_1$, $L_2$ and $L_3$, where $C_1$, $C_2$, $C_3$ are the values used to display a pixel's color corresponding to each color component of a predetermined color model, and where $L_1$, $L_2$, $L_3$ are the measured light source color component values corresponding to each color component of a predetermined color model.

7. A method of combining two or more sets of previously stored image data to form a set of composite image date representing a composite image wherein a first image $I_1$ overlays at least a portion of a second image $I_2$, and wherein each pixel of said first image and each pixel of said second image is defined by pixel data of the form $R_{1\tau}$, $R_{2\tau}$, $R_{3\tau}$, $R_{1\beta}$, $R_{2\beta}$, $R_{3\beta}$, $T_1$, $T_2$, $T_3$, where $R_{1\tau}$, $R_{2\tau}$, $R_{3\tau}$ are respectively the reflection transformation components corresponding to the light reflected back toward the observer for each color component of a predetermined color model format, and $R_{1\beta}$, $R_{2\beta}$, $R_{3\beta}$ are respectively the reflection transformation components corresponding to the light reflected away from the observer for each color component of the predetermined color model, and $T_1$, $T_2$, $T_3$ are respectively the transmission transformation components corresponding to the transmitted light for each color component of the predetermined color model, the transformation components $R_\tau$ and T being related according to the equation $R_\tau+T+A_\tau=1$ wherein the absorption transformation components $A_{1\tau}$, $A_{2\tau}$, $A_{3\tau}$ for light reflected back to the observer are implicit, the transformation components $R_\beta$ and T being related according to the equation $R_\beta+T+A_\beta=1$ wherein the absorption transformation components $A_{1\beta}$, $A_{2\beta}$, $A_{3\beta}$ for light reflected away from the observer are implicit, comprising:

combining the pixel data of said first image with the pixel data of said second image to develop first composite image data including composite pixel data in the form $R'_{1\tau}$, $R'_{2\tau}$, $R'_{3\tau}$, $R'_{1\beta}$, $R'_{2\beta}$, $R'_{3\beta}$, $T'_1$, $T'_2$, $T'_3$ representing the combined pixel data of overlaying pixels of the two images, the combination of overlaying pixel data being accomplished by solving the equations $R'_\tau(i)=R_\tau(i-1)+\{(R_\tau(i)T(i-1)^2)/((1-R_\beta(i-1)R_\tau(i))\}$, $R'_\beta(i)=R_\beta(i)+\{(R_\beta(i-1)T(i)^2)/(1-R_\beta(i-1)R_\tau(i))\}$, and $T'(i)=\{(T(i-1)T(i))/(1-R_\beta(i-1)R_\tau(i))\}$ where (i−1) signifies the said first or top most image layer or composite image layer $I_1$, (i) signifies the said second image layer or composite image layer $I_2$ laying immediately below layer (i−1), $R'_\tau(i)$ signifies collectively the composite reflection transformation components $(R'_{1\tau}, R'_{2\tau}, R'_{3\tau})$ for light reflected back to the observer from all layers above and including layer i, $R'_\beta(i)$ signifies collectively the composite reflection transformation components $(R'_{1\beta}, R'_{2\beta}, R'_{3\beta})$ for the light reflected away from the observer by all layers above and including layer i, and $T'(i)$ signifies collectively the composite transmission transformation components $(T'_1, T'_2, T'_3)$ for light transmitted in either direction by all layers above and including layer i; and determining the color values $C_1$, $C_2$, $C_3$ of each pixel in the final composite image by multiplying the reflection transformation components $R'_{1\tau}, R'_{2\tau}$ and $R'_{3\tau}$ by light component values $L_1$, $L_2$ and $L_3$, where $C_1$, $C_2$, $C_3$ are the values used to display a pixel's color corresponding to each color component of a predetermined color model, and where $L_1$, $L_2$, $L_3$ are the measured light source color component values corresponding to each color component of a predetermined color model.

8. A method as recited in any one of claims 4, 5, 6 and 7, wherein at least a portion of one of said first and second images overlays a portion of a third image and further comprising the step of:

combining the composite pixel data of said first composite image with the pixel data of said third image by again solving the above equations to obtain a set of second composite image data including composite pixel data in the form $R'_{1\tau}, R'_{2\tau}, R'_{3\tau}, R'_{1\beta}, R'_{2\beta}, R'_{3\beta}, T'_1, T'_2, T'_3$ in which case the color values $C_1$, $C_2$ and $C_3$ are determined by multiplying the composite reflection transformation components $R'_{1\tau}, R'_{2\tau}, R'_{3\tau}$ by light component values $L_1$, $L_2$, $L_3$.

9. Apparatus for developing and storing image data in the form of transformation components corresponding to each pixel of an object, comprising:

means for illuminating an object disposed in front of a background that is totally absorptive of incident light;

means for measuring the percentage of incident light reflected from each pixel of the surface of said object in terms of a first set of at least three reflection transformation components $r_1$, $r_2$, $r_3$ each of which represents the reflected light value in terms of one color component of a predetermined color model;

means for disposing said object in front of a background that is substantially totally reflective of incident light;

means for illuminating said object;

means for measuring the percentage of incident light that appears to be reflected from each pixel of the surface of said object in terms of a second set of at least three pseudo-reflection transformation components $r'_1$, $r'_2$, $r'_3$, each of which is proportional to the intensity of one color component of the predetermined color model;

means using the relationship $$(t_1, t_2, t_3) = \{((r'_1, r'_2, r'_3) - (r_1, r_2, r_3))(1 - (r_1, r_2, r_3))\}^{1/2}$$

to determine the transmission transformation components $t_1$, $t_2$, $t_3$ of each pixel; and means for storing the six transformation components $r_1$, $r_2$, $r_3$, $t_1$, $t_2$, $t_3$ corresponding to each pixel of the object.

10. Apparatus as recited in claim 9 wherein said predetermined color model is an RGB data image format and wherein $r_1$, $r_2$, $r_3$ respectively represent the red, green and blue reflection transformation components, and wherein $t_1$, $t_2$, $t_3$ respectively represent the red, green and blue transmission transformation components.

11. Apparatus as recited in claim 9, wherein said predetermined color model is selected from the group of image data formats consisting of RGB, HLS, YUV, Lab, HSV, YIQ, CMY and CMYK color components.

12. Apparatus for combining two or more sets of previously stored image data to form a set of composite image data representing a composite image wherein a first image $I_1$ overlays at least a portion of a second image $I_2$, and wherein each pixel of said first image is defined by pixel data of the form $R_{1\tau}, R_{2\tau}, R_{3\tau}, R_{1\beta}, R_{2\beta}, R_{3\beta}, T_1, T_2, T_3$, where $R_{1\tau}, R_{2\tau}, R_{3\tau}$ are respectively the reflection transformation components corresponding to the light reflected back toward the observer for each color component of a predetermined color model, and $R_{1\beta}, R_{2\beta}, R_{3\beta}$ are respectively the reflection transformation components corresponding to the light reflected away from the observer for each color component of the predetermined color model, and $T_1$, $T_2$, $T_3$ are respectively the transmission transformation components corresponding to the transmitted light for each color component of the predetermined color model, the transformation components $R_\tau$ and $T$ being related according to the equation $R_\tau + T + A_\tau = 1$ wherein the absorption transformation components $A_{1\tau}, A_{2\tau}, A_{3\tau}$ for light reflected back to the observer are implicit, the transformation components $R_\beta$ and $T$ being related according to the equation $R_\beta + T + A_\beta = 1$ wherein the absorption transformation components $A_{1\beta}, A_{2\beta}, A_{3\beta}$ for light reflected away from the observer are implicit, and each pixel of said second image is defined by pixel data in the form $r_1$, $r_2$, $r_3$, $t_1$, $t_2$, $t_3$, where $r_1$, $r_2$, $r_3$ are respectively the reflection transformation components corresponding to each color component of the predetermined color model, and $t_1$, $t_2$, $t_3$ are respectively the transmission transformation components corresponding to each color component of the predetermined color model, the transformation components $r$ and $t$ being related according to the equation $r + t + a = 1$ wherein the absorption transformation components $a_1$, $a_2$, $a_3$ are implicit, comprising:

means for combining the pixel data of said first image with the pixel data of said second image to develop first composite image data including composite pixel data in the form $R'_{1\tau}, R'_{2\tau}, R'_{3\tau}, R'_{1\beta}, R'_{2\beta}, R'_{3\beta}, T'_1, T'_2, T'_3$ representing the combined pixel data of overlaying pixels of the two images, the combination of overlaying pixel data being accomplished by solving the equations $R'_\tau(i) = R_\tau(i-1) + \{(r(i)T(i-1)^2)/((1-R_\beta(i-1)r(i))\}$, $R'_\beta(i) = r(i) + \{(R_\beta(i-1)t(i)^2)/(1-R_\beta(i-1)r(i))\}$, and $T'(i) = \{(T(i-1)t(i))/(1-R_\beta(i-1)r(i))\}$ where (i−1) signifies the said first or top most image layer or composite image layer $I_1$, (i) signifies the said second image layer or composite image layer $I_2$ laying immediately below (i−1), $R'_\tau(i)$ signifies collectively the composite reflection transformation components $(R'_{1\tau}, R'_{2\tau}, R'_{3\tau})$ for light reflected back to the observer from all layers above and including layer i, $R'_\beta(i)$ signifies collectively the composite reflection transformation components $(R'_{1\beta}, R'_{2\beta}, R'_{3\beta})$ for the light reflected away from the observer by all layers above and including layer i, and $T'(i)$ signifies collectively the composite transmission transformation components $(T'_1, T'_2, T'_3)$ for light transmitted in either direction by all layers above and including layer i; and means for determining the color values $C_1, C_2, C_3$ of each pixel in the final composite image by multiplying the reflection transformation components $R'_{1\tau}$, $R'_{2\tau}$ and $R'_{3\tau}$ by the light component values $L_1$, $L_2$ and $L_3$, where $C_1, C_2, C_3$ are the values used to display a pixel's color corresponding to each color component of a predetermined color model, and where $L_1, L_2, L_3$ are the measured light source color component values corresponding to each color component of a predetermined color model.

13. Apparatus for combining two or more sets of previously stored image data to form a set of composite image data representing a composite image wherein a first image $I_1$ overlays at least a portion of a second image $I_2$, and wherein each pixel of said first image is defined by pixel data of the form $R_{1\tau}, R_{2\tau}, R_{3\tau}, R_{1\beta}, R_{2\beta}, R_{3\beta}, T_1, T_2, T_3$, where $R_{1\tau}, R_{2\tau}, R_{3\tau}$ are respectively the reflection transformation components corresponding to the light reflected back toward the observer for each color component of a predetermined color model, and $R_{1\beta}, R_{2\beta}, R_{3\beta}$ are respectively the reflection transformation components corresponding to the light reflected away from the observer for each color component of the predetermined color model, and $T_1, T_2, T_3$ are respectively the transmission transformation components corresponding to the transmitted light for each color component of the predetermined color model, the transformation components $R_\tau$ and T being related according to the equation $R_\tau+T+A_\tau=1$ wherein the absorption transformation components $A_{1\tau}, A_{2\tau}, A_{3\tau}$ for light reflected back to the observer are implicit, the transformation components $R_\beta$ and T being related according to the equation $R_\beta+T+A_\beta=1$ wherein the absorption transformation components $A_{1\beta}, A_{2\beta}, A_\beta$ for light reflected away from the observer are implicit, and each pixel of said second image is defined by pixel data in the form $r_1, r_2, r_3, t_1, t_2, t_3$, where $r_1, r_2, r_3$ are respectively the reflection transformation components corresponding to each color component of a predetermined color model, and $t_1, t_2, t_3$ are respectively the transmission transformation components corresponding to each color component of the predetermined color model, the transformation components r and t being related according to the equation $r+t+a=1$ wherein the absorption transformation components $a_1, a_2, a_3$ are implicit, comprising:

means for combining the pixel data of each pixel of said first image with the pixel data of said second image to develop first composite image data including composite pixel data in the form $R'_{1\tau}$, $R'_{2\tau}$, $R'_{3\tau}$, $R'_{1\beta}$, $R'_{2\beta}$, $R'_{3\beta}$, $T'_1$, $T'_2$, $T'_3$ representing the combined pixel data of overlaying pixels of the two images, the combination of overlaying pixel data being accomplished by solving the equations $R'_\tau(i) = R_\tau(i-1) + \{[r(i)T(i-1)^2]/[(1-R_\beta(i-1)r(i))]\},$ $R'_\beta(i) = r(i) + \{[R_\beta(i-1)r(i)^2]/[1-R_\beta(i-1)r(i))]\},$ and $T'(i) = \{[T(i-1)r(i)]/[1-R_\beta(i-1)r(i))]\}$ where (i–1) signifies the said first or top most image layer or composite image layer $I_1$, (i) signifies the said second image layer or composite image layer $I_2$ laying immediately below layer (i–1), $R'_\tau(i)$ signifies collectively the composite reflection transformation components $(R'_{1\tau}, R'_{2\tau}, R'_{3\tau})$ for light reflected back to the observer from all layers above and including layer i, $R'_\beta(i)$ signifies collectively the composite reflection transformation components $(R'_{1\beta}, R'_{2\beta}, R'_{3\beta})$ for the light reflected away from the observer by all layers above and including layer i, and $T'(i)$ signifies collectively the composite transmission transformation components $(T'_1, T'_2, T'_3)$ for light transmitted in either direction by all layers above and including layer i; and means for determining the color values $C_1, C_2, C_3$ of each pixel in the final composite image by multiplying the reflection transformation components $R'_{1\tau}, R'_{2\tau}$ and $R'_{3\tau}$ by light component values $L_1, L_2$ and $L_3$, where $C_1, C_2, C_3$ are the values used to display a pixel's color corresponding to each color component of a predetermined color model, and where $L_1, L_2, L_3$ are the measured light source color component values corresponding to each color component of a predetermined color model.

14. Apparatus for combining two or more sets of previously stored image data to form a composite image wherein a first image $I_1$ overlays at least a portion of a second image $I_2$, and wherein each pixel of said first image and each pixel of said second image is defined by pixel data of the form $R_{1\tau}$, $R_{2\tau}, R_{3\tau}, R_{1\beta}, R_{2\beta}, R_{3\beta}, T_1, T_2, T_3$, where $R_{1\tau}, R_{2\tau}, R_{3\tau}$ are respectively the reflection transformation components corresponding to the light reflected back toward the observer for each color component of a predetermined color model, and $R_{1\beta}, R_{2\beta}, R_{3\beta}$ are respectively the reflection transformation components corresponding to the light reflected away from the observer for each color component of the predetermined color model, and $T_1, T_2, T_3$ are respectively the transmission transformation components corresponding to the transmitted light for each color component of the predetermined color model, the transformation components $R_\tau$ and T being related according to the equation $R_\tau+T+A_\tau=1$ wherein the absorption transformation components $A_{1\tau}, A_{2\tau}, A_{3\tau}$ for light reflected back to the observer are implicit, the transformation components $R_\beta$ and T being related according to the equation $R_\beta+T+A_\beta=1$ wherein the absorption transformation components $A_{1\beta}, A_{2\beta}, A_{3\beta}$ for light reflected away from the observer are implicit, comprising:

means for combining the pixel data of said first image with the pixel data of said second image to develop first composite image data including composite pixel data in the form $R'_{1\tau}$, $R'_{2\tau}$, $R'_{3\tau}$, $R'_{1\beta}$, $R'_{2\beta}$, $R'_{3\beta}$, $T'_1$, $T'_2$, $T'_3$ representing the combined pixel data of overlaying pixels of the two images, the combination of overlaying pixel data being accomplished by solving the equations $R'_\tau(i) = R_\tau(i-1) + R_\tau(i)T(i-1)^2,$ $R'_\beta(i) = R_\beta(i) + R_\beta(i-1)T(i)^2,$ and $T'(i) = T(i-1)T(i) + R_\tau(i-1)R_\tau(i)T(i-1)T(i)$ where (i–1) signifies the said first or top most image layer or composite image layer $I_1$, (i) signifies the said second image layer or composite image layer $I_2$ laying immediately below (i–1), $R'_\tau(i)$ signifies collectively the composite reflection transformation components $(R'_{1\tau}, R'_{2\tau}, R'_{3\tau})$ for light reflected back to the observer from all layers above and including layer i, $R'_\beta(i)$ signifies collectively the composite reflection transformation components $(R'_{1\beta}, R'_{2\beta}, R'_{3\beta})$ for the light reflected away from the observer by all layers above and including layer i, and $T'(i)$ signifies collectively the composite transmission transformation components $(T'_1, T'_2, T'_3)$ for light transmitted in either direction by all layers above and including layer i; and means for determining the color values $C_1$, $C_2$, $C_3$ of each pixel in the final composite image by multiplying the reflection transformation components $R'_{1\tau}, R'_{2\tau}$ and $R'_{3\tau}$ by light component values $L_1, L_2$ and $L_3$, where $C_1$, $C_2$, $C_3$ are the values used to display a pixel's color corresponding to each color component of a predetermined color model, and where $L_1$, $L_2$, $L_3$ are the measured light source color component values corresponding to each color component of a predetermined color model.

15. Apparatus for combining two or more sets of previously stored image data to form a set of composite image data representing a composite image wherein a first image $I_1$ overlays at least a portion of a second image $I_2$, and wherein each pixel of said first image and each pixel of said second image is defined by pixel data of the form $R_{1\tau}, R_{2\tau}, R_{3\tau}, R_{1\beta}, R_{2\beta}, R_{3\beta}, T_1, T_2, T_3$, where $R_{1\tau}, R_{2\tau}, R_{3\tau}$ are respectively the reflection transformation components corresponding to the light reflected back toward the observer for each color component of a predetermined color model, and $R_{1\beta}, R_{2\beta}, R_{3\beta}$ are respectively the reflection transformation components corresponding to the light reflected away from the observer for each color component of the predetermined color model, and $T_1, T_2, T_3$ are respectively the transmission transformation components corresponding to the transmitted light for each color component of the predetermined color model, the transformation components $R_\tau$ and $T$ being related according to the equation $R_\tau + T + A_\tau = 1$ wherein the absorption transformation components $A_{1\tau}, A_{2\tau}, A_{3\tau}$ for light reflected back to the observer are implicit, the transformation components $R_\beta$ and $T$ being related according to the equation $R_\beta + T + A_\beta = 1$ wherein the absorption transformation components $A_{1\beta}, A_{2\beta}, A_{3\beta}$ for light reflected away from the observer are implicit, comprising:

means for combining the pixel data of said first image with the pixel data of said second image to develop first composite image data including composite pixel data in the form $R'_{1\tau}, R'_{2\tau}, R'_{3\tau}, R'_{1\beta}, R'_{2\beta}, R'_{3\beta}, T'_1, T'_2, T'_3$ representing the combined pixel data of overlaying pixels of the two images, the combination of overlaying pixel data being accomplished by solving the equations $$R'_\tau(i) = R_\tau(i-1) + \{(R_\tau(i)T(i-1)^2)/((1-R_\beta(i-1)R_\tau(i))\},$$

$$R'_\beta(i) = R_\beta(i) + \{(R_\beta(i-1)T(i)^2)/(1-R_\beta(i-1)R_\tau(i))\}, \text{ and}$$

$$T'(i) = \{(T(i-1)T(i))/(1-R_\beta(i-1)R_\tau(i))\}$$

where (i−1) signifies the said first or top most image layer or composite image layer $I_1$, (i) signifies the said second image layer or composite image layer $I_2$ laying immediately below layer (i−1), $R'_\tau(i)$ signifies collectively the composite reflection transformation components $(R'_{1\tau}, R'_{2\tau}, R'_{3\tau})$ for light reflected back to the observer from all layers above and including layer i, $R'_\beta(i)$ signifies collectively the composite reflection transformation components $(R'_{1\beta}, R'_{2\beta}, R'_{3\beta})$ for the light reflected away from the observer by all layers above and including layer i, and $T'(i)$ signifies collectively the composite transmission transformation components $(T'_1, T'_2, T'_3)$ for light transmitted in either direction by all layers above and including layer i; and means for determining the color values $C_1$, $C_2$, $C_3$ of each pixel in the final composite image by multiplying the reflection transformation components $R'_{1\tau}, R'_{2\tau}$ and $R'_{3\tau}$ by light component values $L_1, L_2$ and $L_3$, where $C_1$, $C_2$, $C_3$ are the values used to display a pixel's color corresponding to each color component of a predetermined color model, and where $L_1$, $L_2$, $L_3$ are the measured light source color component values corresponding to each color component of a predetermined color model.

16. Apparatus as recited in any one of claims 12, 13, 14 and 15, wherein at least a portion of one of said first and second images overlays a portion of a third image, and further comprising:

means for combining the composite pixel data of said first composite image with the pixel data of said third image by again solving the above equations to obtain second composite image data including composite pixel data in the form $R'_{1\tau}, R'_{2\tau}, R'_{3\tau}, R'_{1\beta}, R'_{2\beta}, R'_{3\beta}, T'_1, T'_2, T'_3$ in which case the color values $C_1$, $C_2$ and $C_3$ are determined by multiplying the composite reflection transformation components $R'_{1\tau}, R'_{2\tau}, R'_{3\tau}$ by light component values $L_1, L_2, L_3$.

17. Apparatus for developing a composite image by combining multiple layers of images wherein at least a portion of each layer overlays at least a portion of one or more of the layers beneath it, comprising:

memory means for storing pixel data corresponding to each pixel of each of a plurality of images, the pixel data being stored in the form $r_1, r_2, r_3, t_1, t_2, t_3$, where each r term is a reflection transformation component for one color component of a predetermined color model, and each of the t terms is a transmission transformation component for one color component of the color model;

accumulator means for initially receiving first pixel data corresponding to pixels of a first image which overlays a second image represented by second pixel data stored in said memory means, and for thereafter accumulating composite image data formed by the combination of said first and second pixel data and the subsequent combinations of accumulated composite image data with pixel data representing subsequently processed images overlaid by the previously accumulated images;

read/write means for addressing and retrieving pixel data corresponding to an image stored in said memory means and for addressing and retrieving pixel data corresponding to accumulated composite image data contained in said accumulator means;

computing means for receiving the pixel data retrieved from said memory means and the composite pixel data retrieved from said accumulator means, and for calculating new composite image data for input to said accumulator means, such calculation being implemented according to the equations $$R'_\tau(i) = R_\tau(i-1) + \{(r(i)T(i-1)^2)/((1-R_\beta(i-1)r(i))\},$$

$$R'_\beta(i) = r(i) + \{(R_\beta(i-1)t(i)^2)/(1-R_\beta(i-1)r(i))\}, \text{ and}$$

$T'(i)=\{(T(i-1)t(i))/(1-R_\beta(i-1)r(i))\}$ where
(i-1) signifies the said first or top most image layer or composite image layer $I_1$,
(i) signifies the said second image layer or composite image layer $I_2$ laying immediately below layer (i-1),
$R'_\tau(i)$ signifies collectively the composite reflection transformation components $(R'_{1\tau}, R'_{2\tau}, R'_{3\tau})$ for light reflected back to the observer from all layers above and including layer i,
$R'_\beta(i)$ signifies collectively the composite reflection transformation components $(R'_{1\beta}, R'_{2\beta}, R'_{3\beta})$ for the light reflected away from the observer by all layers above and including layer i, and
$T'(i)$ signifies collectively the composite transmission transformation components $(T'_1, T'_2, T'_3)$ for light transmitted in either direction by all layers above and including layer i;
means for generating a light source color value;
pixel color calculating means for extracting the composite reflection transformation components $R'_1$, $R'_2$ and $R'_3$ calculated by said accumulator means for each pixel of the accumulated composite image and for multiplying same by said light source color value to generate pixel color components $C_1$, $C_2$ and $C_3$ for each pixel of said composite image; and
display means responsive to said pixel color components and operative to display the composite image, where $C_1$, $C_2$, $C_3$ are the values used to display a pixel's color corresponding to each color component of a predetermined color model, and where $L_1$, $L_2$, $L_3$ are the measured light source color component values corresponding to each color component of a predetermined color model.

18. Apparatus as recited in claim 17, wherein said computing means is an arithmetic unit including logic circuitry for implementing the above equations.

19. Apparatus as recited in claim 17, wherein said pixel color calculating means is an arithmetic unit including logic circuitry for multiplying each composite reflection coefficient by said light source color value.

20. Image composition apparatus as recited in claim 19, wherein said means for combining is an arithmetic logic unit for implementing the mathematical relationships $R'_\tau(i)=R_\tau(i-1)+\{(R_\tau(i)T(i-1)^2)/((1-R_\beta(i-1)R_\tau(i))\}$, $R'_\beta(i)=R_\beta(i)+\{(R_\beta(i-1)T(i)^2)/(1-R_\beta(i-1)R_\tau(i))\}$, and $T'(i)=\{(T(i-1)T(i))/(1-R_\beta(i-1)R_\tau(i))\}$ where
(i-1) signifies the said first or top most image layer or composite image layer $I_1$,
(i) signifies the said second image layer or composite image layer $I_2$ laying immediately below layer (i-1),
$R'_\tau(i)$ signifies collectively the composite reflection transformation components $(R'_{1\tau}, R'_{2\tau}, R'_{3\tau})$ for light reflected back to the observer from all layers above and including layer i,
$R'_\beta(i)$ signifies collectively the composite reflection transformation components $(R'_{1\beta}, R'_{2\beta}, R'_{3\beta})$ for the light reflected away from the observer by all layers above and including layer i, and
$T'(i)$ signifies collectively the composite transmission transformation components $(T'_1, T'_2, T'_3)$ for light transmitted in either direction by all layers above and including layer i; and
to obtain composite pixel transformation components $R'_\tau$, $R'_\beta$ and $T'$ for each pixel of the composite image.

21. Apparatus as recited in claim 17, and further including image storage means for storing composite image data accumulated by said accumulator means, the stored composite image data being accessible by said pixel color calculating means and transferable to said memory means for subsequent use.

22. Apparatus as recited in claim 17, wherein said computing means includes a plurality of arithmetic units for respectively calculating the $R'_\tau(i)$, $R'_\beta(i)$ and $T'(i)$ transformation components for each color component of the selected color model.

23. Apparatus as recited in claim 17, wherein said computing means is implemented in the form of a pipelined logic circuit, including a plurality of arithmetic units connected in parallel to perform the calculations set forth above.

24. Apparatus as recited in claim 17, and further comprising means for comparing the accumulated transparency transformation component $T'(i)$ of each pixel of the accumulated pixel data to a predetermined minimum opaque threshold value and for ending the processing of lower layers when the threshold value is exceeded.

25. Image composition apparatus as recited in claim 17, wherein said means for combining is an arithmetic logic unit for implementing the mathematical relationships $R'_\tau(i)=R_\tau(i-1)+r(i)T(i-1)^2$, $R'_\beta(i)=r(i)+R_\beta(i-1)t(i)^2$, and $T'(i)=T(i-1)t(i)+R_\beta(i-1)r(i)T(i-1)t(i)$ where
(i-1) signifies the said first or top most image layer or composite image layer $I_1$,
(i) signifies the said second image layer or composite image layer $I_2$ laying immediately below (i-1),
$R'_\tau(i)$ signifies collectively the composite reflection transformation components $(R'_{1\tau}, R'_{2\tau}, R'_{3\tau})$ for light reflected back to the observer from all layers above and including layer i,
$R'_\beta(i)$ signifies collectively the composite reflection transformation components $(R'_{1\beta}, R'_{2\beta}, R'_{3\beta})$ for the light reflected away from the observer by all layers above and including layer i, and
$T'(i)$ signifies collectively the composite transmission transformation components $(T'_1, T'_2, T'_3)$ for light transmitted in either direction by all layers above and including layer i;
to obtain composite pixel transformation components $R'_\tau$, $R'_\beta$ and $T'$ for each pixel of the composite image.

26. Image composition apparatus as recited in claim 17, wherein said means for combining is an arithmetic logic unit for implementing the mathematical relationships $R'_\tau(i)=R_\tau(i-1)+R_\tau(i)T(i-1)^2$, $R'_\beta(i)=R_\beta(i)+R_\beta(i-1)T(i)^2$, and $T'(i)=T(i-1)T(i)+R_\beta(i-1)R_\tau(i)T(i-1)T(i)$ where
(i-1) signifies the said first or top most image layer or composite image layer $I_1$,
(i) signifies the said second image layer or composite image layer $I_2$ laying immediately below (i-1), $R'_\tau(i)$ signifies collectively the composite reflection transformation components $(R'_{1\tau}, R'_{2\tau}, R'_{3\tau})$ for light reflected back to the observer from all layers above and including layer i, $R'_\beta(i)$ signifies collectively the composite reflection transformation components $(R'_{1\beta}, R'_{2\beta}, R'_{3\beta})$ for the light reflected away from the observer by all layers above and including layer i, and $T'(i)$ signifies collectively the composite transmission transformation components $(T'_1, T'_2, T'_3)$ for light transmitted in either direction by all layers above and including layer i;

to obtain composite pixel transformation components $R'_\tau$, $R'_\beta$ and $T'$ for each pixel of the composite image.

27. Image composition apparatus for composing, from the top down, a stack of images to be combined, comprising:

means for scanning the images and for developing pixel data in the form $r_1, r_2, r_3, t_1, t_2, t_3$ where $r_1, r_2, r_3$ are respectively the reflection transformation components corresponding to each color component of a predetermined color model, and $t_1, t_2, t_3$ are respectively the transmission transformation components corresponding to each color component of the predetermined color model, the transformation components r and t being related according to the equation r+t+a=1 wherein the absorption transformation components $a_1, a_2, a_3$ are implicit;

means for combining the pixel data of the topmost image or previously combined composite image with the pixel data of a lower image disposed immediately thereebeneath to develop reflection transformation components $R'_\tau$ representing light reflected toward the scanning means by the upper and lower images, reflection transformation components $R'_\beta$ representing light reflected away from the scanning means by the upper and lower images, and transmission transformation components $T'$ representing light transmitted in any direction;

means for accumulating the three sets of coefficients;

means for extracting the transformation components $R'_\tau$ from the last composite accumulation and for multiplying such transformation components with a selected color value to produce color pixel information; and display means for using said color pixel information to display the composite image.

* * * * *